(12) United States Patent
Wang et al.

(10) Patent No.: US 11,598,980 B2
(45) Date of Patent: Mar. 7, 2023

(54) MICRO-MACHINED THIN FILM LITHIUM NIOBATE ELECTRO-OPTIC DEVICES

(71) Applicant: President and Fellows of Harvard College, Cambridge, MA (US)

(72) Inventors: Cheng Wang, Cambridge, MA (US); Mian Zhang, Cambridge, MA (US); Marko Loncar, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 785 days.

(21) Appl. No.: 16/324,898

(22) PCT Filed: Aug. 11, 2017

(86) PCT No.: PCT/US2017/046560
§ 371 (c)(1),
(2) Date: Feb. 11, 2019

(87) PCT Pub. No.: WO2018/031916
PCT Pub. Date: Feb. 15, 2018

(65) Prior Publication Data
US 2021/0255489 A1 Aug. 19, 2021

Related U.S. Application Data

(60) Provisional application No. 62/374,226, filed on Aug. 12, 2016.

(51) Int. Cl.
*G02F 1/035* (2006.01)
*G02F 1/225* (2006.01)
*G02F 1/00* (2006.01)

(52) U.S. Cl.
CPC ............ *G02F 1/035* (2013.01); *G02F 1/0018* (2013.01); *G02F 1/225* (2013.01); *G02F 2203/15* (2013.01)

(58) Field of Classification Search
CPC .......... G02F 1/00; G02F 1/035; G02F 1/0018; G02F 1/03; G02F 1/0316; G02F 1/225;
(Continued)

(56) References Cited

U.S. PATENT DOCUMENTS 3,877,781 A 4/1975 Kaminow
4,527,866 A 7/1985 Bowman et al.
(Continued)

FOREIGN PATENT DOCUMENTS

CN 101031842 A 9/2007
CN 102213797 A 10/2011
(Continued)

OTHER PUBLICATIONS

Chen et al., "Hybrid silicon and lithium niobate electro-optical ring modulator," Optica, 1(2):112-118 (2014).
(Continued)

*Primary Examiner* — Jie Lei
(74) *Attorney, Agent, or Firm* — Potomac Law Group, PLLC; Reza Mollaaghababa

(57) ABSTRACT

Optical devices and their fabrication from thin film lithium niobate are provided. In some embodiments, an optical device includes a substrate and an optical waveguide disposed on the substrate. The optical waveguide comprises lithium niobate. The optical waveguide has a central ridge extending laterally along the substrate. A pair of electrodes is disposed on opposite sides of the central ridge of the optical waveguide.

29 Claims, 30 Drawing Sheets

(58) Field of Classification Search
CPC ........ G02F 1/2257; G02F 1/011; G02F 1/025;
G02F 1/0344; G02F 1/0152; G02F
2201/07; G02F 2203/15; G02B 6/10;
G02B 6/136; G02B 6/132; G02B 6/1345;
H01L 21/02; H01L 21/027; H01L 21/308;
H01L 21/3065; B05D 5/06
USPC .... 359/279, 245, 248, 315; 385/2–4, 14, 20,
385/24, 32, 129, 131
See application file for complete search history.

(56) References Cited

U.S. PATENT DOCUMENTS

| | | | |
|---|---|---|---|
| 5,334,854 A | 8/1994 | Ono et al. | |
| 5,455,876 A | 10/1995 | Hopfer et al. | |
| 6,118,571 A | 9/2000 | Wessels et al. | |
| 6,194,323 B1 | 2/2001 | Downey et al. | |
| 6,522,793 B1 | 2/2003 | Szilagyi et al. | |
| 7,095,926 B2 * | 8/2006 | Sugiyama | G02F 1/2255 385/40 |
| 7,389,030 B2 * | 6/2008 | Mitomi | G02F 1/035 385/129 |
| 7,460,739 B2 | 12/2008 | Gilardi et al. | |
| 7,970,241 B2 | 6/2011 | Chen et al. | |
| 8,318,519 B2 | 11/2012 | Doan et al. | |
| 8,610,994 B1 | 12/2013 | Lentine et al. | |
| 8,900,899 B2 | 12/2014 | Rabiei | |
| 9,036,239 B2 * | 5/2015 | Bouvrot | G02F 1/0027 359/279 |
| 9,111,730 B2 | 8/2015 | Rabiei | |
| 9,229,158 B2 | 1/2016 | Rabiei | |
| 2001/0053165 A1 | 12/2001 | Wang et al. | |
| 2003/0001237 A1 | 1/2003 | Yang | |
| 2003/0134231 A1 | 7/2003 | Tsai et al. | |
| 2006/0148262 A1 | 7/2006 | Lee et al. | |
| 2009/0236693 A1 | 9/2009 | Moustakas et al. | |
| 2014/0213059 A1 | 7/2014 | Doan et al. | |
| 2015/0138619 A1 | 5/2015 | Iwatsuka et al. | |

FOREIGN PATENT DOCUMENTS

| | | |
|---|---|---|
| CN | 103682978 A | 3/2014 |
| WO | WO-02075444 A1 | 9/2002 |

OTHER PUBLICATIONS

Guarino et al., "Electro-optically turnable microring resonators in lithium niobate," Nature Photonics, 1(7):407-410 (2007).

International Search Report and Written Opinion for International Application No. PCT/US2017/046560 dated Dec. 5, 2017.

Rabiei et al., "Heterogeneous lithium niobate photonics on silicon substrates," Optics Express, 21(21):25573-25581 (2013).

Wang et al., "High-Q lithium niobate microdisk resonators on a chip for efficient electro-optic modulation," Optics Express, 23(18):23072-23078 (2015).

Wang et al., "Integrated high quality factor lithium niobate microdisk resonators," Opt Express, 22(25):30924-30933 (2014).

Wooten et al., "A review of lithium niobate modulators for fiber-optic communications systems," Selected Topics in Quantum Electronics, IEE Journal, 6(1):69-82 (2000).

* cited by examiner

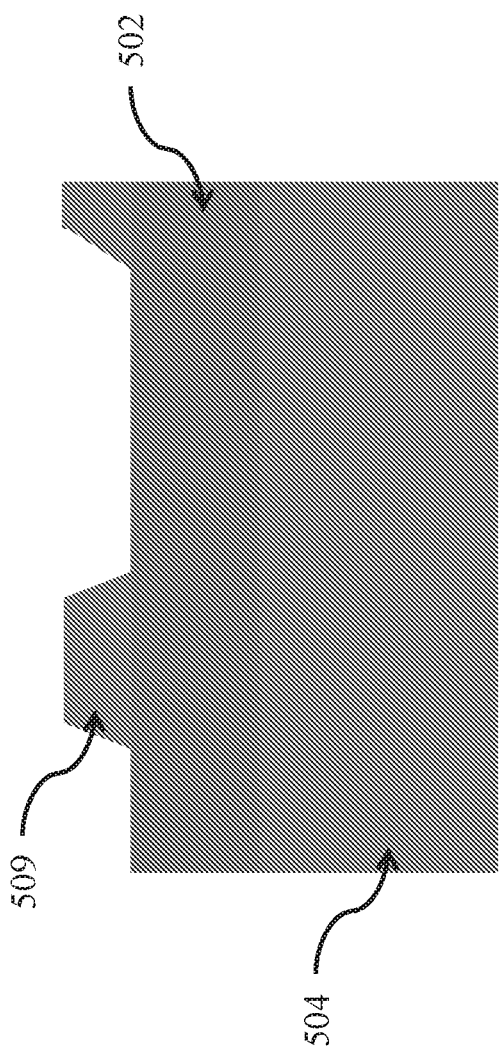

Racetrack
22 Gbps

Racetrack
30 Gbps

40 Gbps

MZI
5 Gbps 12.5 Gbps

22 Gbps

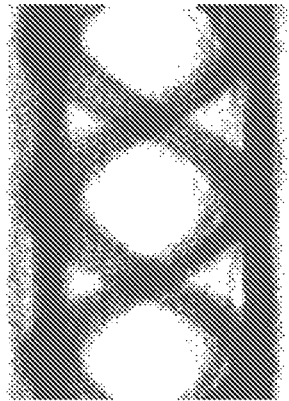 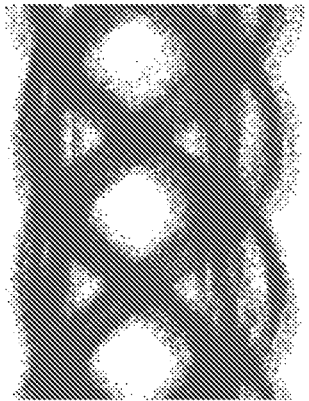
Fig. 25A 12.5 Gbps ΔT = 20 °C
Fig. 25B 22.5 Gbps ΔT = 20 °C

MICRO-MACHINED THIN FILM LITHIUM NIOBATE ELECTRO-OPTIC DEVICES

CROSS-REFERENCE TO RELATED APPLICATIONS

This application is a national stage of PCT/US17/46560, filed Aug. 11, 2017, which claims the benefit of U.S. Provisional Application No. 62/374,226, filed Aug. 12, 2016, which are hereby incorporate by reference in their entirety.

BACKGROUND

Embodiments of the present invention relate to optical waveguides, and more specifically, to optical devices fabricated from thin film lithium niobate (LN).

BRIEF SUMMARY

According to an embodiment of the present disclosure, a method of fabricating an optical waveguide is provided. A first resist is deposited on a lithium niobate film. A second resist is deposited on the first resist in a first pattern. The first resist is patterned according to the first pattern. The lithium niobate film is etched to transfer the first pattern from the first resist to the lithium niobate film.

In some embodiments, the lithium niobate film has a thickness of about 1 µm or less. In some embodiments, the lithium niobate film has a thickness of about 700 nm or less. In some embodiments, the lithium niobate film has a thickness of about 400 nm or less.

In some embodiments, the lithium niobate film is disposed on an insulator. In some embodiments, the insulator has a refractive index less than that of the lithium niobate film. In some embodiments, the insulator comprises silicon dioxide.

In some embodiments, the insulator is disposed on a carrier. In some embodiments, the carrier comprises lithium niobate. In some embodiments, the carrier comprises silicon. In some embodiments, the carrier comprises quartz. In some embodiments, the carrier comprises silica. In some embodiments, the carrier comprises sapphire.

In some embodiments, the first resist comprises amorphous silicon. In some embodiments, the first resist comprises silicon dioxide. In some embodiments, the first resist comprises silicon nitride. In some embodiments, the first resist comprises aluminum oxide. In some embodiments, the first resist comprises titanium dioxide. In some embodiments, the first resist has a hardness greater than a hardness of the second resist. In some embodiments, the first resist is deposited by chemical vapor deposition. In some embodiments, the first resist is deposited by plasma-enhanced chemical vapor deposition. In some embodiments, the first resist is p-doped. In some embodiments, the first resist has a thickness of about 800 nm.

In some embodiments, the second resist comprises a polymer. In some embodiments, the polymer comprises a flowable oxide. In some embodiments, the polymer comprises FOX-16. In some embodiments, the second resist is deposited by spin coating. In some embodiments, depositing the second resist comprises lithographically patterning the second resist according to the first pattern. In some embodiments, the second resist is lithographically patterned by electron beam lithography.

In some embodiments, the first resist is etched by dry etching. In some embodiments, the first resist is etched by reactive-ion etching. In some embodiments, the reactive-ion etching is inductively coupled plasma reactive-ion etching. In some embodiments, the reactive-ion etching uses Ar+ plasma.

In some embodiments, the lithium niobate film is etched by dry etching. In some embodiments, the lithium niobate film is etched by reactive-ion etching. In some embodiments, the reactive-ion etching is inductively coupled plasma reactive-ion etching. In some embodiments, the reactive-ion etching uses Ar+ plasma.

In some embodiments, the method includes removing the first resist from the lithium niobate film. In some embodiments, removing the first resist from the lithium niobate film includes exposing the first resist to a potassium hydroxide solution. In some embodiments, the potassium hydroxide solution is a 30% solution. In some embodiments, the first resist is exposed to potassium hydroxide solution at about 80° C. for about 2 minutes.

In some embodiments, the method includes patterning electrodes on the insulator. In some embodiments, the electrodes are patterned by electron-beam lithography. In some embodiments, the electron beam lithography comprises PMMA lift-off. In some embodiments, the electrodes comprise metal. In some embodiments, the electrodes comprise gold.

In some embodiments, the method includes patterning electrodes on the lithium niobate film. In some embodiments, the electrodes are patterned by electron-beam lithography. In some embodiments, the electron beam lithography comprises PMMA lift-off. In some embodiments, the electrodes comprise metal. In some embodiments, the electrodes comprise gold.

In some embodiments, the lithium niobate film is monolithic.

According to another embodiment of the present disclosure, an electro-optic device is provided. The device includes a substrate. An optical waveguide is disposed on the substrate. The optical waveguide comprises lithium niobate. The optical waveguide has a central ridge extending laterally along the substrate. A pair of electrodes is disposed on opposite sides of the central ridge of the optical waveguide.

In some embodiments, the central ridge has a width of about 1 µm or less. In some embodiments, the central ridge has a width of about 900 nm or less. In some embodiments, the central ridge has a width of about 500 nm. In some embodiments, the central ridge has a width of about 400 nm.

In some embodiments, the optical waveguide includes legs extending outwards from the central ridge along the first side of the substrate between the first side of the substrate and the electrodes. In some embodiments, the legs have a height less than a height of the central ridge. In some embodiments, the height of the legs is less than or equal to half the height of the central ridge. In some embodiments, the legs have a height of about 300 nm.

In some embodiments, the lithium niobate is crystalline and disposed such that the x-axis of its crystal lattice extends substantially perpendicularly to the first side of the substrate. In some embodiments, the lithium niobate is monolithic.

In some embodiments, the central ridge has a thickness of about 1 µm or less. In some embodiments, the central ridge has a thickness of about 700 nm or less. In some embodiments, the central ridge has a thickness of about 400 nm or more. In some embodiments, the central ridge has a thickness of about 400 nm.

In some embodiments, the substrate is an insulator. In some embodiments, the insulator has a refractive index less than that of the optical waveguide. In some embodiments, the insulator comprises silicon dioxide.

In some embodiments, the device includes a carrier, the substrate being disposed on the carrier. In some embodiments, the carrier comprises lithium niobate. In some embodiments, the carrier comprises silicon. In some embodiments, the carrier comprises quartz. In some embodiments, wherein the carrier comprises silica. In some embodiments, the carrier comprises sapphire.

In some embodiments, the electrodes comprise metal. In some embodiments, the electrodes comprise gold. In some embodiments, the pair of electrodes is adapted to modulate an optical mode of the optical waveguide when a voltage is applied across the pair of electrodes.

In some embodiments, the optical waveguide comprises a substantially semicircular bend. In some embodiments, the substantially semicircular bend has a radius of about 50 μm or less. In some embodiments, the substantially semicircular bend has a radius of about 20 μm. In some embodiments, the substantially semicircular bend has a radius of about 5 μm.

In some embodiments, the pair of electrodes each have a length of about 1 mm or less.

In some embodiments, the optical waveguide is disposed along a substantially serpentine path defined by a plurality of arcuate segments. In some embodiments, the arcuate segments are substantially semicircular. In some embodiments, each of the arcuate segments has a radius of less than about 50 μm. In some embodiments, each of the arcuate segments has a radius of about 20 μm. In some embodiments, each of the arcuate segments has a radius of about 5 μm. In some embodiments, each of the arcuate segments is separated about 1 mm or less.

In some embodiments, the pair of electrodes is separated by about 3.5 μm.

In some embodiments, the optical waveguide is disposed along a substantially annular path. In some embodiments, the optical waveguide is disposed on the first side of the substrate to form a ring resonator. In some embodiments, the optical waveguide is disposed on the first side of the substrate to form a racetrack resonator. In some embodiments, the optical waveguide is disposed on the first side of the substrate to form a Mach-Zehnder interferometer.

In some embodiments, the device is adapted to shift a resonance wavelength by an applied voltage. In some embodiments, the device is adapted to provide velocity matching. In some embodiments, the device is adapted to provide electro-optic modulation.

BRIEF DESCRIPTION OF THE SEVERAL VIEWS OF THE DRAWINGS

FIGS. 5A-E are schematic views of an optical device that in sequence illustrate the steps of a device fabrication method according to embodiments of the present disclosure.

FIGS. 25A-B are eye diagrams of a Mach-Zehnder interferometer according to embodiments of the present disclosure.

DETAILED DESCRIPTION

Figure 1:
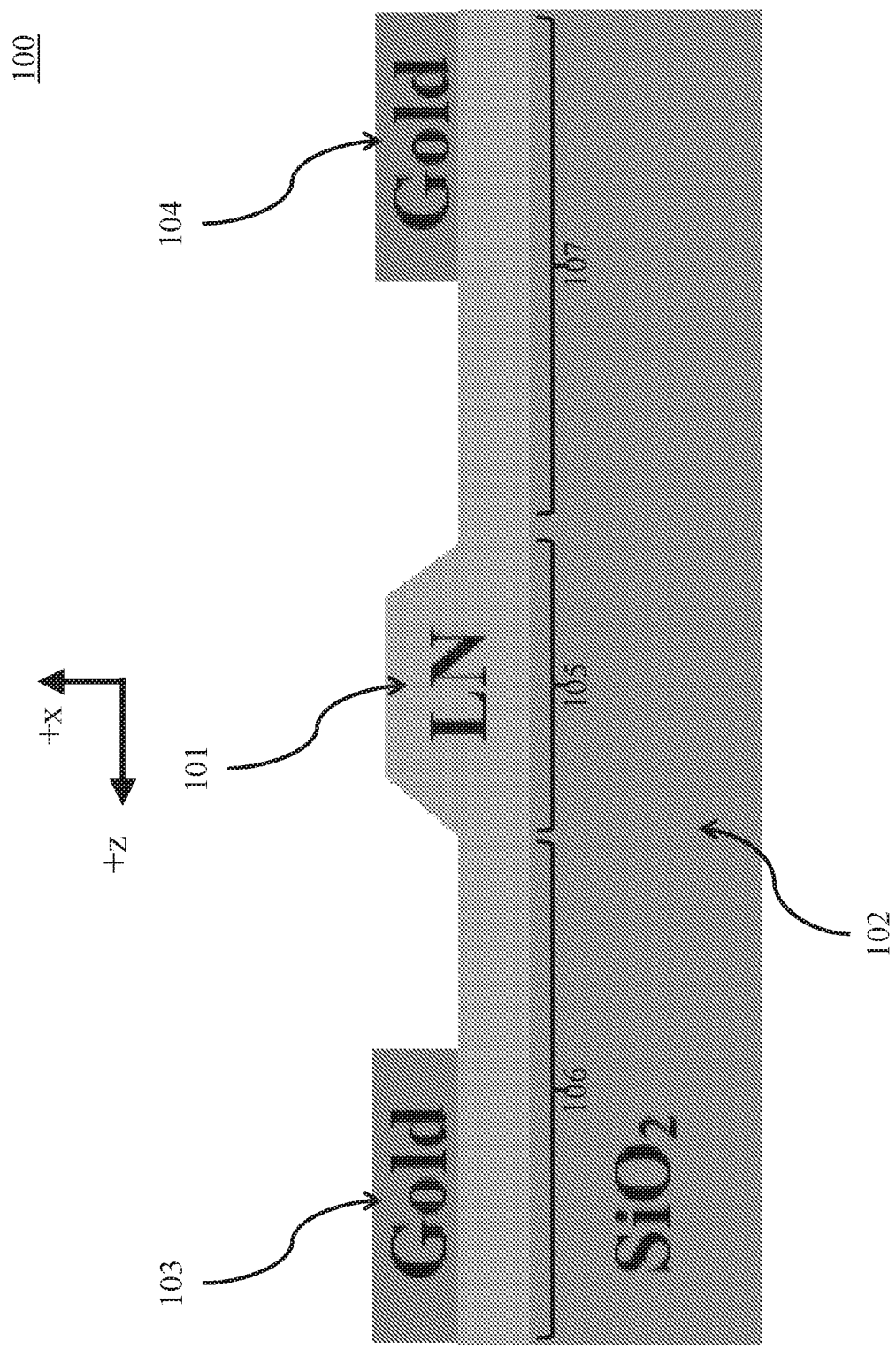
FIG. 1 is a cross-sectional view of an electro-optic modulator according to embodiments of the present disclosure.

The conversion of information from the electrical to the optical domain is a core process in modern communication, data center operations, and light assisted ranging applications. Such conversion may be achieved in an electro-optic device, where the applied DC/AC voltage induces a corresponding change in the properties of the optical field, such as intensity or phase.

Provided herein are integrated thin film lithium niobate (LN) devices, including waveguides and racetrack resonators, for electro-optic applications. Also provided herein are designs for and methods of fabrication of electro-optic modulators that convert electrical voltage signal to optical intensity or phase modulation.

Various resonator-based lithium niobate electro-optic device are provided, that include a racetrack or ring resonator fabricated on thin film lithium niobate. The resonance wavelength is shifted by an applied voltage. Such devices are useful for compact, high-speed electro-optic modulators and switches.

Similarly, various Mach-Zehnder interferometer (MZI) based thin-film lithium niobate electro-optic devices are provided. Velocity matching for electro-optic modulation on such thin-film lithium niobate substrates is provided. Such devices can be used for low loss, low-voltage, and high-speed electro-optic modulators and switches.

The physical principle of electro-optic conversion in devices according to embodiments of the present disclosure is based on the $\chi^{(2)}$ (Pockels) effect, where the material refractive index changes proportionally to the applied external electric field. This effect may also be used for bulk LN modulators. The integrated approaches described herein reduce device footprint, increase device efficiency and enable new design paradigms. Due to the high confinement of the guided optical mode in various embodiments, tight bending of waveguides and resonators is possible. Tight bending allows ring resonators less than 20 um radius to be fabricated.

Micrometer scale photonic structures on LN fabricated according to embodiments of the present disclosure demonstrate improved attributes suitable for on chip electro-optic devices. For modulators, the footprint, energy cost per bit, and electro-optic bandwidth are all improved.

As noted above, modulators according to the present disclosure exhibit reduced size on the order of 20 μm across through high confinement of the optical mode. Alternative designs relying on bulk LN modulators are on the order of 10 cm across. Reduction in the device size enables new designs for optical waveguides and electrical contacts. Bulk LN modulators suffer from radio frequency (RF) propagation losses and are restricted by the RF and optical phase matching condition. In comparison, microstructured thin film LN techniques according to the present disclosure enable microring resonant photonic structures that are efficient and much smaller than the wavelength of the RF field, therefore eliminating restrictions on RF losses and phase matching condition.

Microstructured LN modulators also consume significantly less energy for every bit of information processed in comparison to alternative bulk LN modulators. Reduction in the electrical pad size leads to a smaller capacitance (C) and therefore reduces the amount of energy needed for switching to occur ($Es = \frac{1}{2} CV^2$). While the energy consumption for alternative bulk LN modulators is in the 10 pJ/bit range, devices according to the present disclosure achieve energy consumption on the order of 1 fJ/bit.

Referring to FIG. 1, an exemplary electro-optic modulator according to embodiments of the present disclosure is depicted in cross-section. Modulator structure 100 includes lithographically patterned LN optical waveguide 101 disposed on substrate 102. In some embodiments, substrate 102 comprises silica. In some embodiments, electrical contact pads 103, 104 are located around waveguide 101 to form an electrical capacitor. In some embodiments, waveguide 101 includes a central ridge 105 flanked by outer legs 106, 107 extending outwards from central ridge 105 and disposed beneath contact pads 103, 104. In some embodiments, waveguide 101 is coupled to a LN micro-ring or racetrack optical microcavity. In some embodiments, electrical contact pads are placed around the optical cavity forming an electrical capacitor.

Figure 2A:
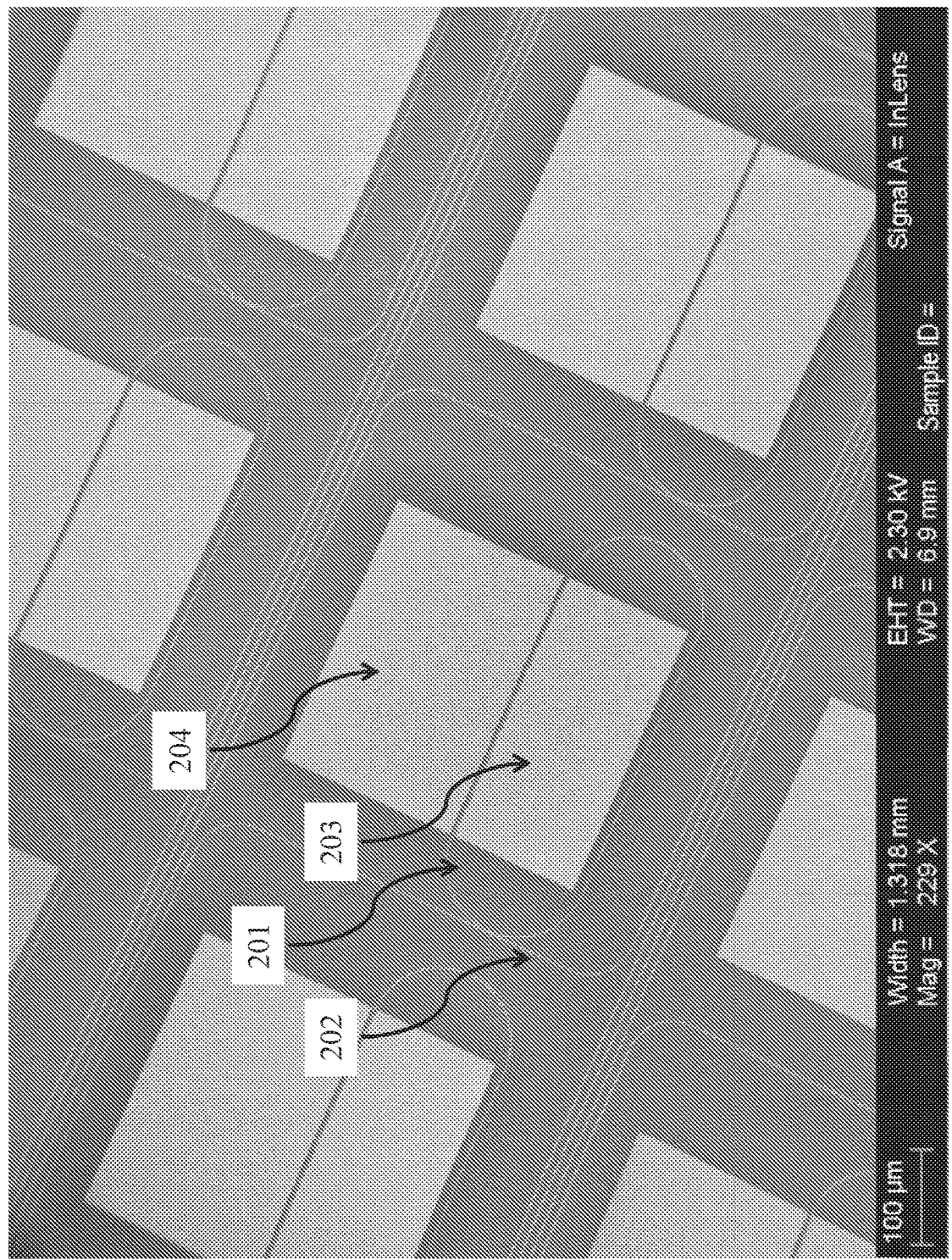
FIGS. 2A-B are SEM images of fabricated racetrack resonator based modulators according to embodiments of the present disclosure.
Figure 2B:
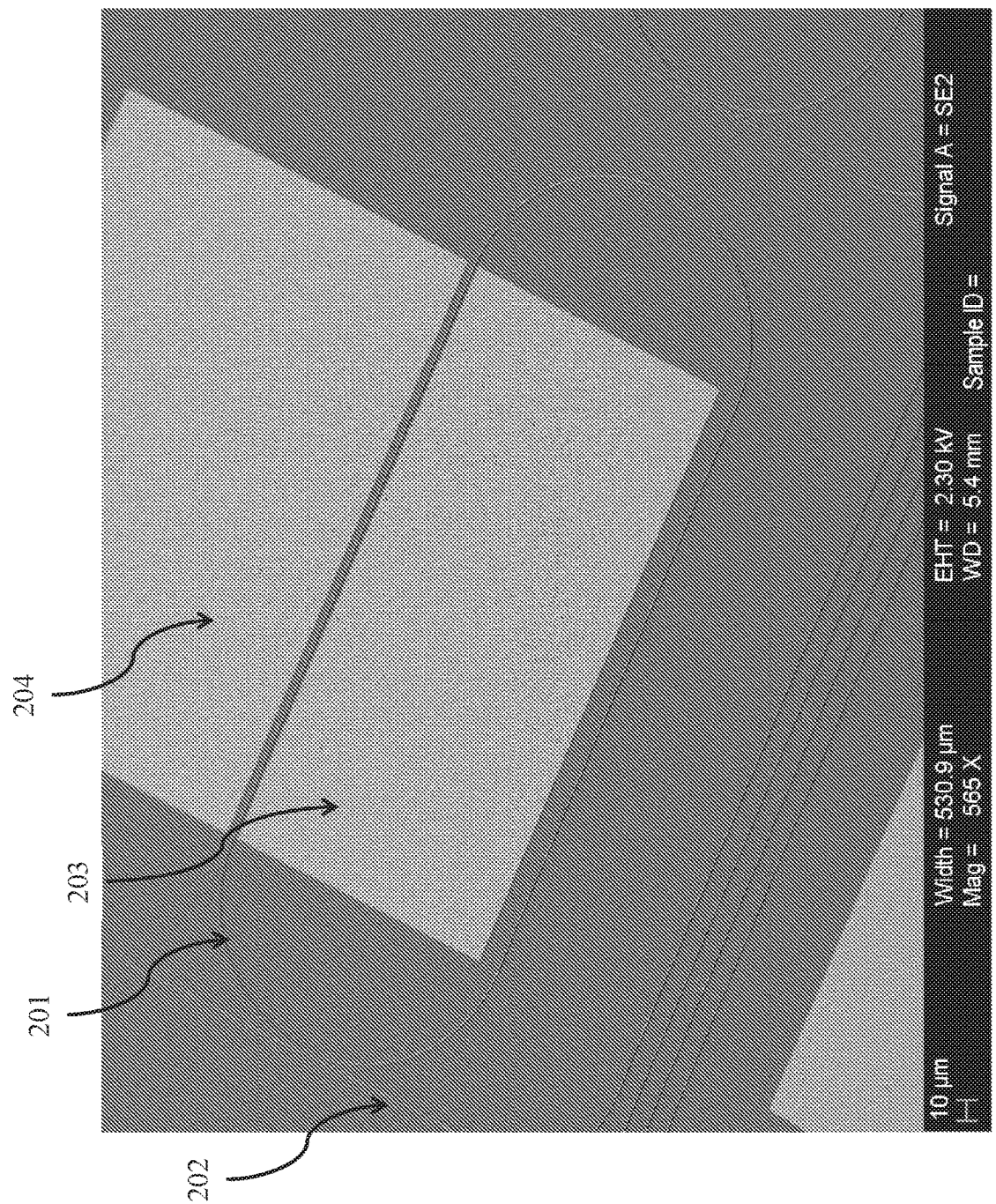

Referring to FIGS. 2A-B, an optical resonator according to embodiments of the present disclosure includes a circular ridge waveguide 201 that supports optical whispering gallery modes (WGM). Optical access to the resonator is achieved by placing a straight bus ridge waveguide 202 adjacent to the resonator 201. Although in the exemplary embodiment depicted, resonator 201 is substantially racetrack shaped, it will be appreciated that the techniques set out herein are suitable for design and fabrication of resonators of various shapes including racetracks and rings. In some embodiments, electrical contact pads 203, 204 are placed around the optical cavity forming an electrical capacitor.

Figure 3:
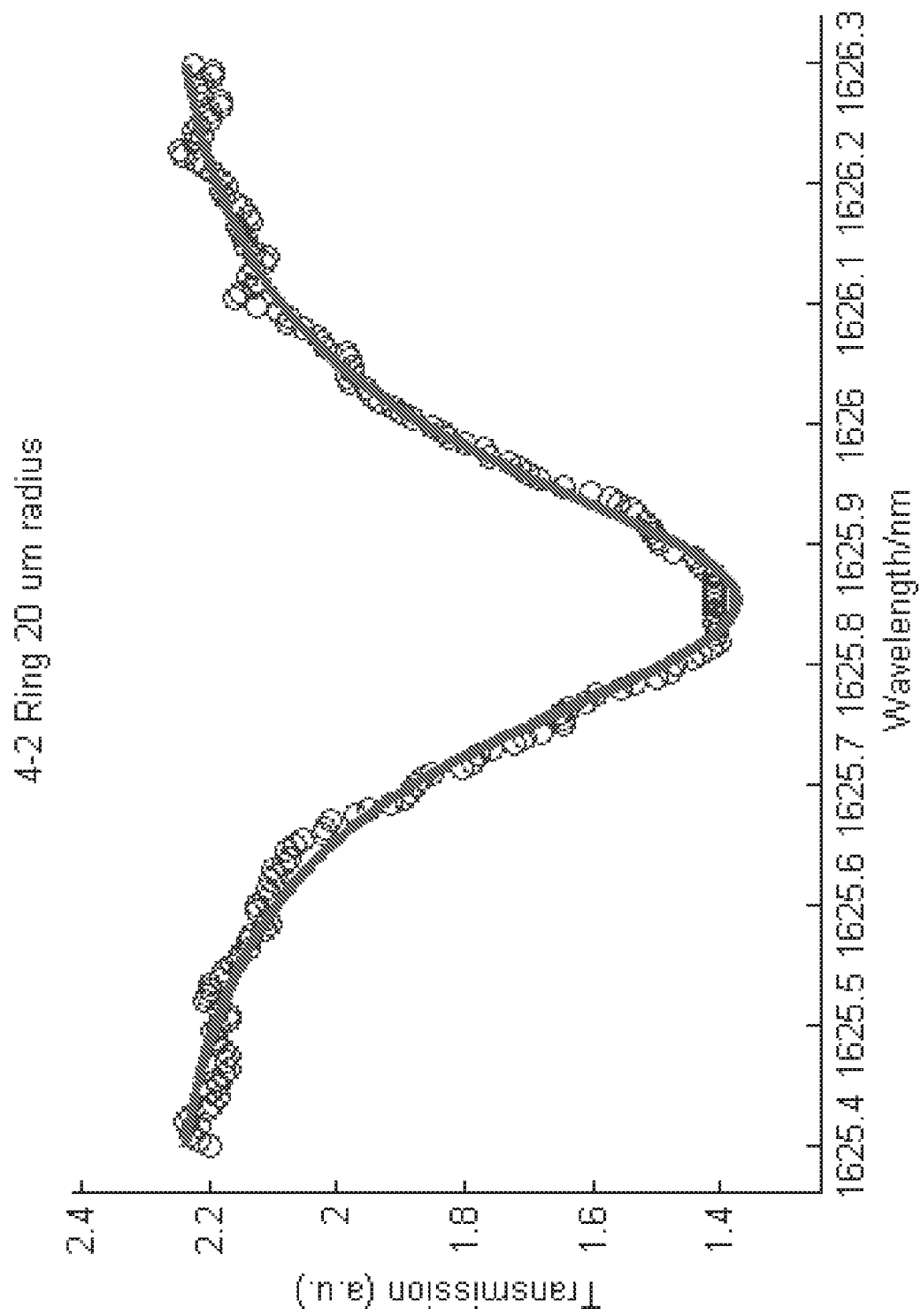
FIG. 3 is a plot of transmission versus wavelength, illustrating the measured optical transmission spectrum of a modulator and its Lorentzian fit according to embodiments of the present disclosure.

Referring to FIG. 3, the measured optical transmission spectrum (shows as circles) of a 20 μm ring modulator and its Lorentzian fit (shown as a solid line) according to embodiments of the present disclosure are illustrated. The loaded optical quality factor is ~5,700. The resonant frequency of the WGM is highly sensitive to the refractive index of the waveguide. As voltage is applied between the contact pads, resonant frequency shift of the cavity leads to a change of the laser transmission.

Figure 4:
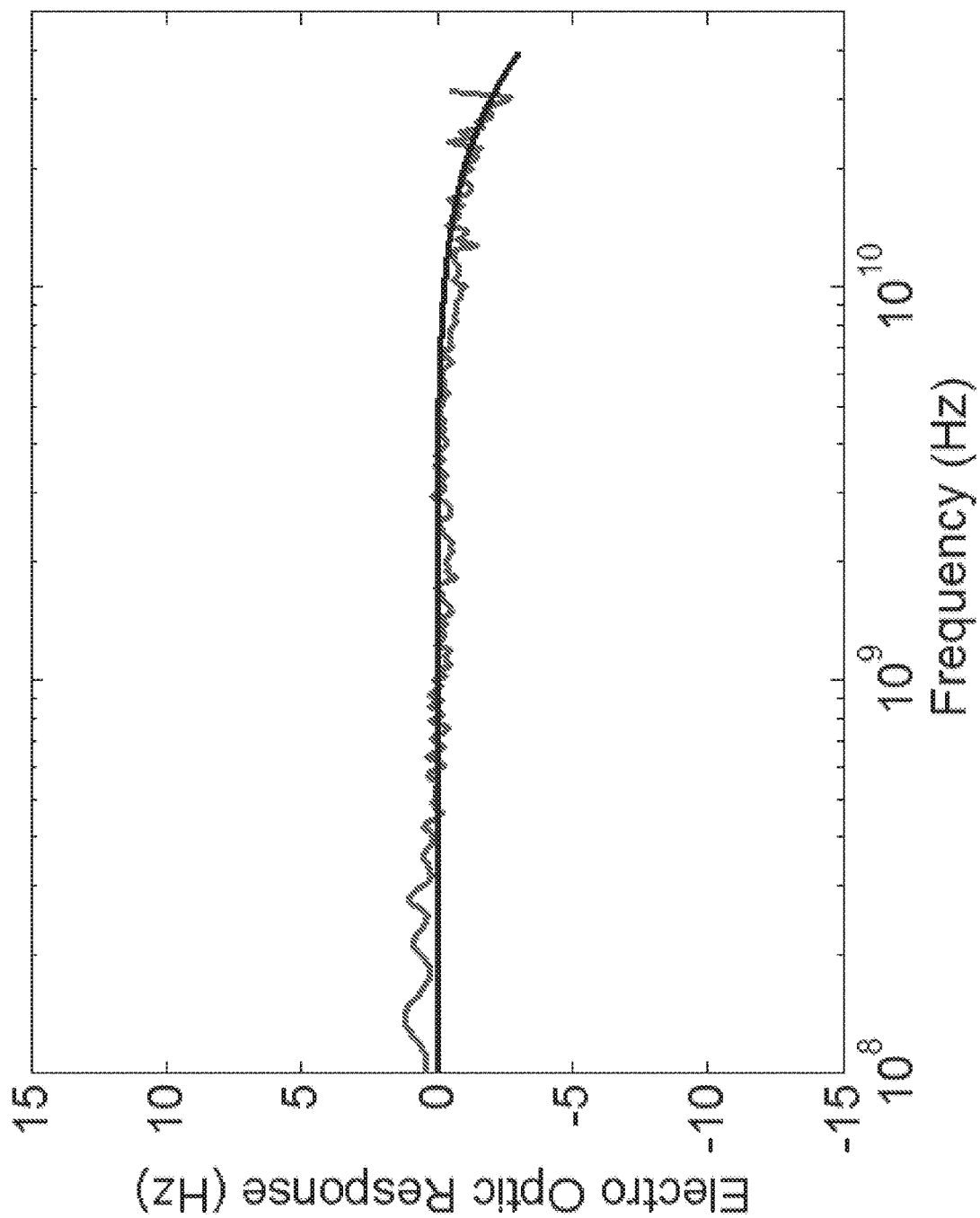
FIG. 4 is a plot of electro-optical response versus frequency, illustrating the frequency response of a modulator according to embodiments of the present disclosure.

Referring to FIG. 4, the frequency response of a 20 μm ring modulator according to embodiments of the present disclosure are illustrated, showing a −3 dB electro-optic bandwidth larger than 40 GHz. The theoretical response is depicted as a smooth curve.

Referring now to FIG. 5, a device fabrication method according to embodiments of the present disclosure according to embodiments of the present disclosure is illustrated. In some embodiments, a waveguide, resonator, or other optical device is fabricated using a combination of lithography and $Ar^+$ plasma dry etching, as set forth below.

Figure 5A:
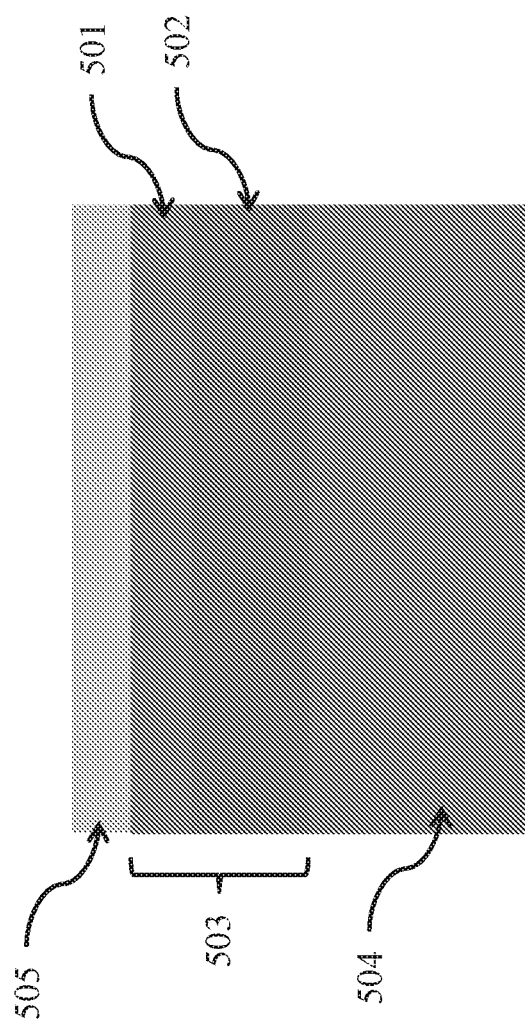

Referring to FIG. 5A, A sub-micron (400-700 nm) LN thin film 501 is bonded on top of lower-index insulator 502 to form a LNOI construct 503. In some embodiments, insulator 502 comprises silicon dioxide. In some embodiments, insulator 502 is disposed on carrier 504. In some embodiments, carrier 504 comprises LN. In some embodiments, carrier 504 comprises silicon. In some embodiments, carrier 504 comprises quartz. A first resist layer 505 is deposited on thin film 501. In some embodiments, first resist layer 505 comprises amorphous silicon or silicon dioxide. In other embodiments, first resist layer 505 comprises silicon nitride, aluminum, or aluminum oxide (aluminum(III) oxide), or titanium dioxide. In some embodiments, first resist layer 505 is deposited by plasma-enhanced chemical vapor deposition (PECVD). In other embodiments, first resist layer 505 is deposited by sputtering, electron beam evaporation, or thermal evaporation. In some embodiments, first resist layer 505 is p-doped. In some embodiments, such as certain embodiments wherein first resist layer 505 comprises silicon, first resist layer 505 is about 800 nm thick.

Figure 5B:
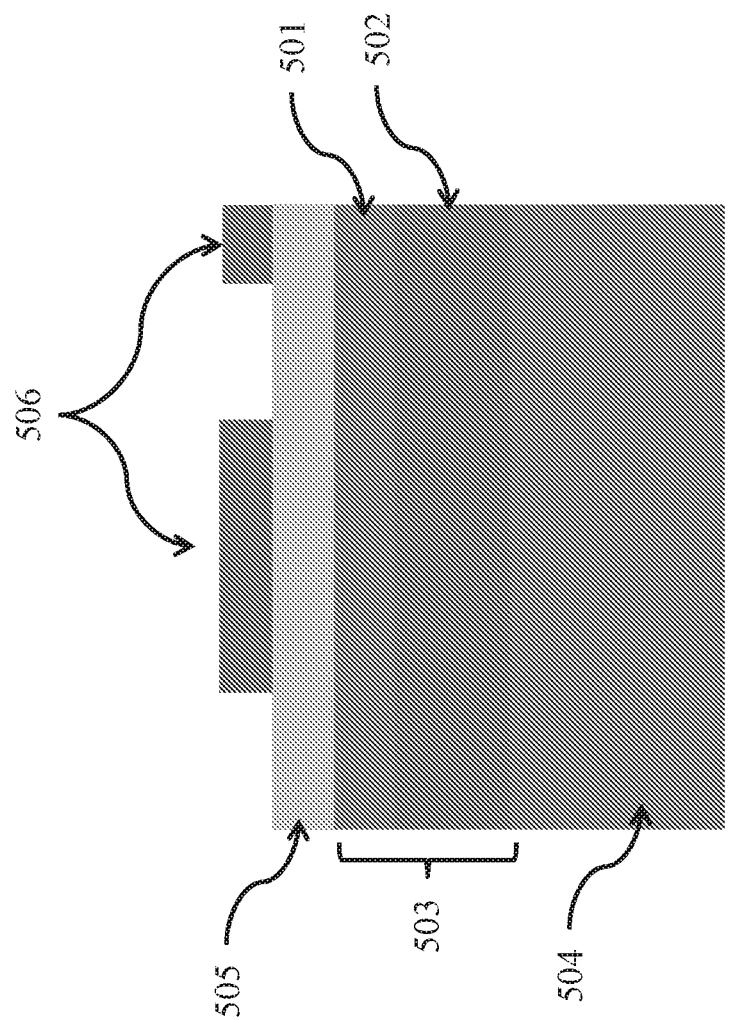

Referring to FIG. 5B, a second resist layer 506 is deposited on first resist layer 505. In some embodiments, the second resist layer comprises a polymer. In some embodiments, the polymer is a flowable oxide. In some embodiments, the polymer is hydrogen silsesquioxane (HSQ). In some embodiments, the polymer is FOX-16. In some embodiments, first resist layer 505 includes a photoresist based on poly(methyl methacrylate) (PMMA), poly(methyl glutarimide) (PMGI), phenol formaldehyde resin (DNQ/Novolac), SU-8, OSTE polymers, Ma-N photoresists, Shipley photoresists, SPR photoresists, or ZEP photoresists. In some embodiments, the polymer is deposited by spin coating. After deposition of second resist layer 506, it is lithographically patterned. In some embodiments, the lithographic patterning comprises electron beam lithography. In some embodiments, the lithographic patterning comprises a photoresist process.

Figure 5C:
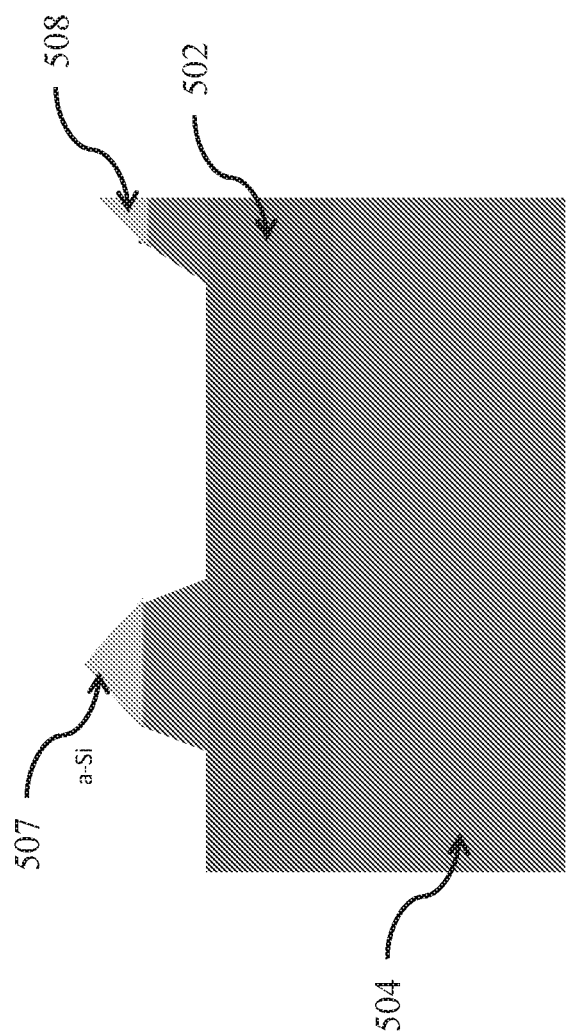

Referring to FIG. 5C, after patterning of second resist layer 506, the pattern is transferred to first resist layer 505, thereby patterning the first resist layer according to the pattern. In some embodiments, the pattern is transferred from second resist layer 506 to first resist layer 505 by reactive-ion etching (RIE). In some embodiments, the RIE is inductively coupled plasma (ICP) RIE. The remaining portions 507 . . . 508 of first resist layer 505 are used as a hard mask for dry etching of LN thin film 501. In some embodiments, dry etching is performed by reactive-ion etching (RIE). In some embodiments, the RIE is electron cyclotron resonance (ECR) RIE. In some embodiments, the RIE uses Ar+ plasma.

Referring to FIG. 5D, in some embodiments, the remaining portions 507 . . . 508 of first resist layer 505 are removed, leaving behind waveguide 509. In some embodiments, removal is performed by exposure to potassium hydroxide solution (KOH). In some embodiments, the KOH solution is a 30%. In some embodiments, exposure is conducted at about 80° C. for about 2 minutes.

Figure 5E:
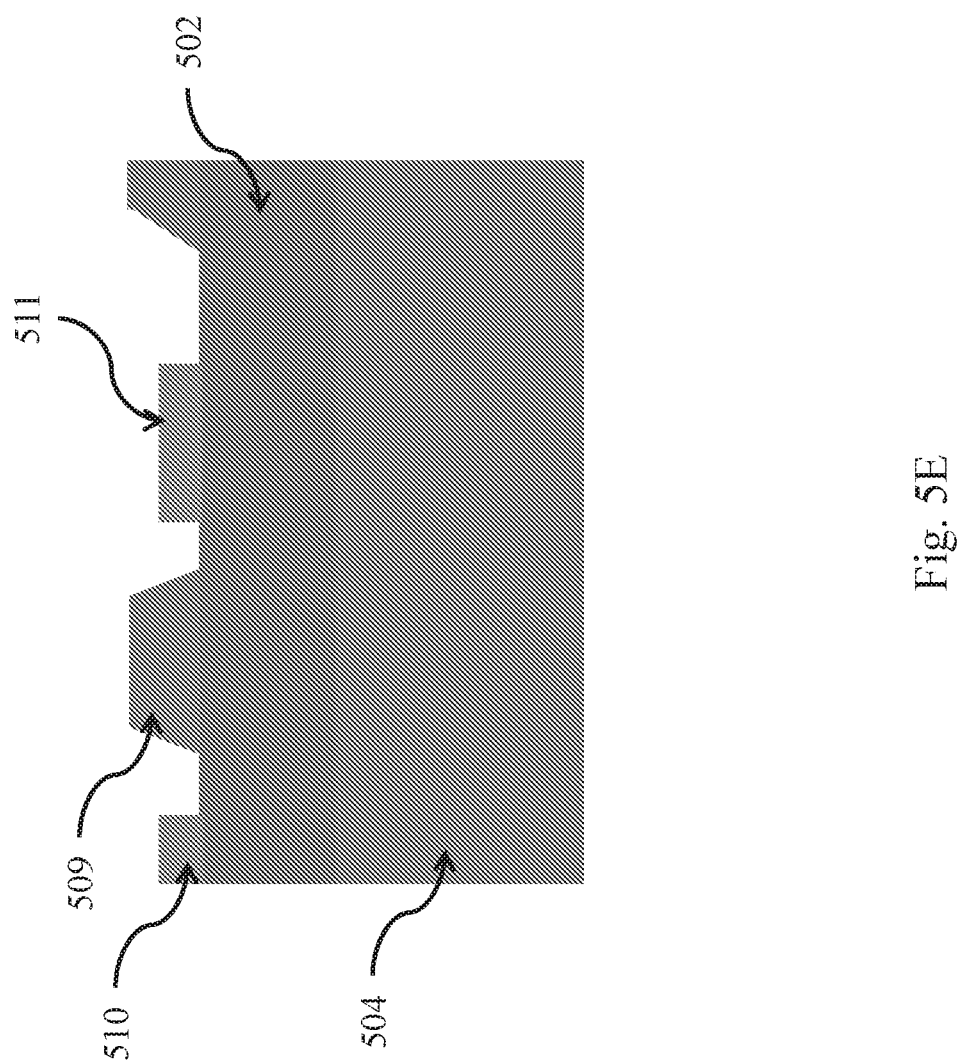

Referring to FIG. 5E in some embodiments, electrodes 510 . . . 511 are patterned around waveguide 509. In some embodiments, electrodes 510 . . . 511 are patterned using electron-beam lithography. In some embodiments, a PMMA lift-off process is used. In some embodiments, electrodes 510 . . . 511 are metallic. In some embodiments, electrodes 510 . . . 511 comprise gold. In some embodiments, electrodes 510 . . . 511 comprise titanium. In some embodiments, electrodes 510 . . . 511 comprise layers of gold and titanium. In some embodiments, electrodes 510 . . . 511 comprise a layer of titanium of about 15 nm and a layer of gold of about 300 nm.

The fabrication process described above delivers waveguide structures with minimum surface roughness and manageable scattering loss through the use of a two-step transfer process. As described, the pattern is transferred from the soft polymer photoresist onto a hard material to create a hard mask with smooth edges. The hard mask is then used to transfer the pattern smoothly to thin film LN. In contrast, alternative waveguides that rely on ion implantation in bulk LN have a large optical mode and are not suitable for bending or fine structures as described herein. Alternative waveguides that are fabricated from LN without the two-step transfer process described herein lack smooth edges, and so exhibit high optical loss. The techniques of the present disclosure yield waveguides with smooth edges, and exhibit optical quality factor Q of at least 100,000, and in some embodiments at least 1,000,000.

As noted above, in some embodiments both a hard mask and a soft polymer resist are used. In some embodiments, the hard mask has a hardness greater than the soft polymer resist. Hardness may be measured using various well-known tests including, e.g., the Vickers, Brinell, Rockwell, Meyer, or Leeb tests.

Figure 6:
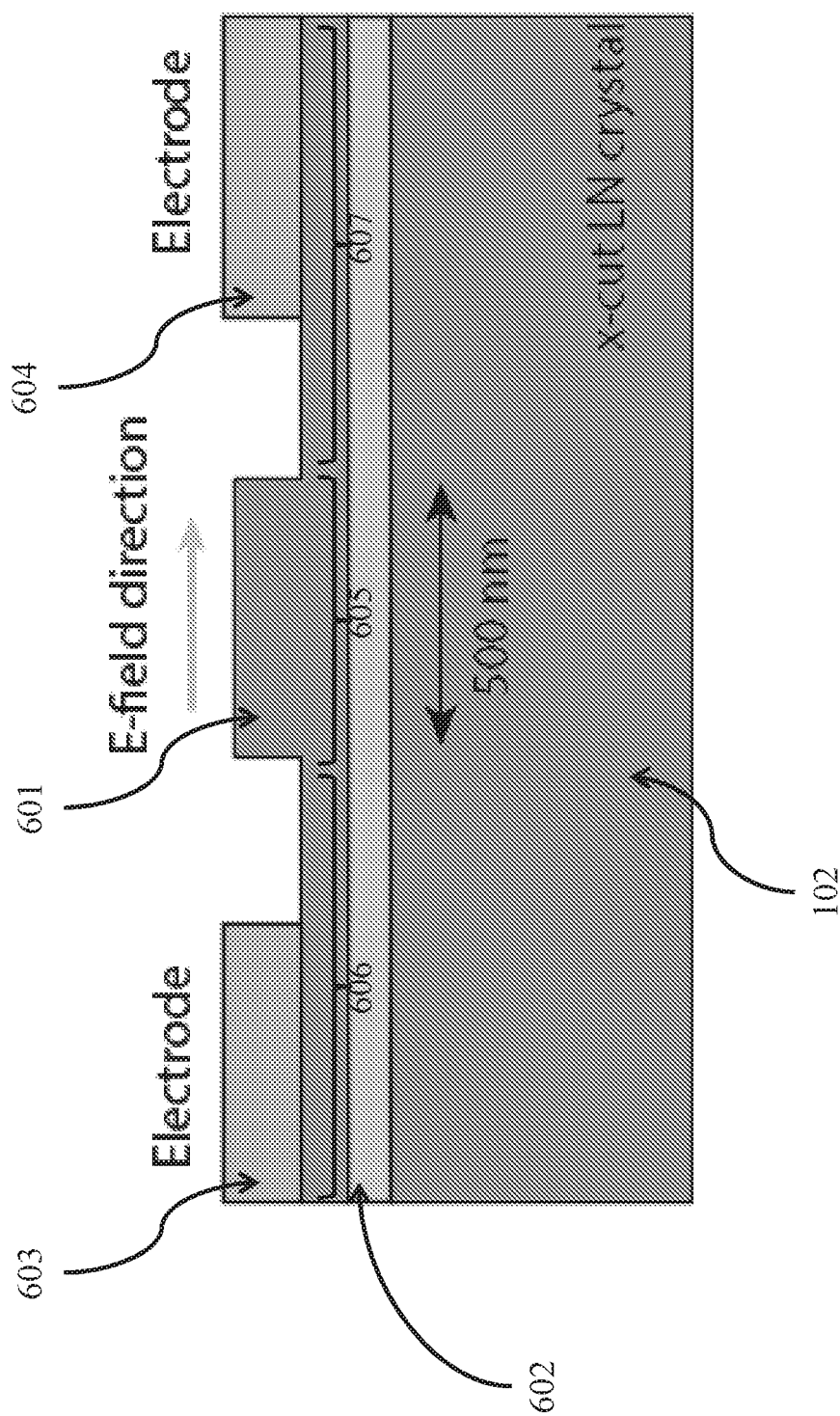
FIG. 6 is a cross-sectional view of a waveguide according to embodiments of the present disclosure.

Referring to FIG. 6, an exemplary electro-optic modulator according to embodiments of the present disclosure is depicted in cross-section. Modulator structure 600 includes optical waveguide 601 disposed on substrate 602. In some embodiments, substrate 602 comprises silica. In some embodiments, electrodes 603, 604 are located around waveguide 601 to form an electrical capacitor. In some embodiments, waveguide 601 includes a central ridge 605 flanked by outer legs 606, 607 extending outwards from central ridge 605 and disposed beneath contact pads 603, 604. In some embodiments, substrate 602 is about 350 nm in height.

In some embodiments, ridge 605 of waveguide 601 is about 500 nm in width. In some embodiments, ridge 605 of waveguide 601 is about 400 nm in width. In other embodiments, ridge 605 of waveguide 601 has a width less than about 1 µm. The narrow width of ridge 605 of waveguide 601 provides for good confinement of the optical mode and enables tight bending of the waveguide. Moreover, the narrow width enables electrodes 603, 604 to be located close together, which reduces power usage and increases efficiency. In some embodiments, a waveguide is curved to a radius about 20 µm. In some embodiments, ridge 605 of waveguide 601 is about 350 nm in height. In some embodiments, ridge 605 of waveguide 601 is about 200 nm in height.

Some embodiments include outer legs 606, 607, while some do not. When present, outer legs 606, 607 aid the propagation of the electric field. In particular, by extending beneath electrodes 603, 604, voltage drop over air is minimized. However, addition of legs 606, 607 reduces confinement of the optical mode to ridge 605. In addition, legs 606, 607 increase the minimum bend radius of waveguide 601. In general, where legs 606, 607 have a height of about half or less the height of ridge 605, confinement remains high enough for the applications discussed herein.

As pictured, optical waveguide 601 is fabricated from an x-cut LN crystal such that the x-axis of the LN crystal lattice extends outwards substantially perpendicularly to the substrate. As noted above, the LN crystal exhibits electric field induced birefringence. Although the fabrication techniques described herein are orientation agnostic, the x-cut enables positioning of electrodes to either side of the ridge 605, such that the orientation of the electric field formed thereby is substantially parallel to substrate 602 and substantially perpendicular to waveguide 601. In some embodiments, the z-axis of the LN crystal is oriented in the same direction as the electric field.

In contrast, alternative waveguides that rely on ion implantation in bulk LN to form a waveguide have a large optical mode, on the order of 5 µm, and are not suitable for bending or fine structures as described herein. In addition, as the waveguide is embedded in the bulk, electrodes cannot be positioned at either side of the waveguide.

Alternative waveguides that are fabricated from z-cut LN crystals require that electrodes be positioned above and below the waveguide. Stacking electrodes beneath an LN waveguide leads to a more expensive and more complex fabrication process. Moreover, the large electrodes involved lead to a large capacitance.

Figure 7:
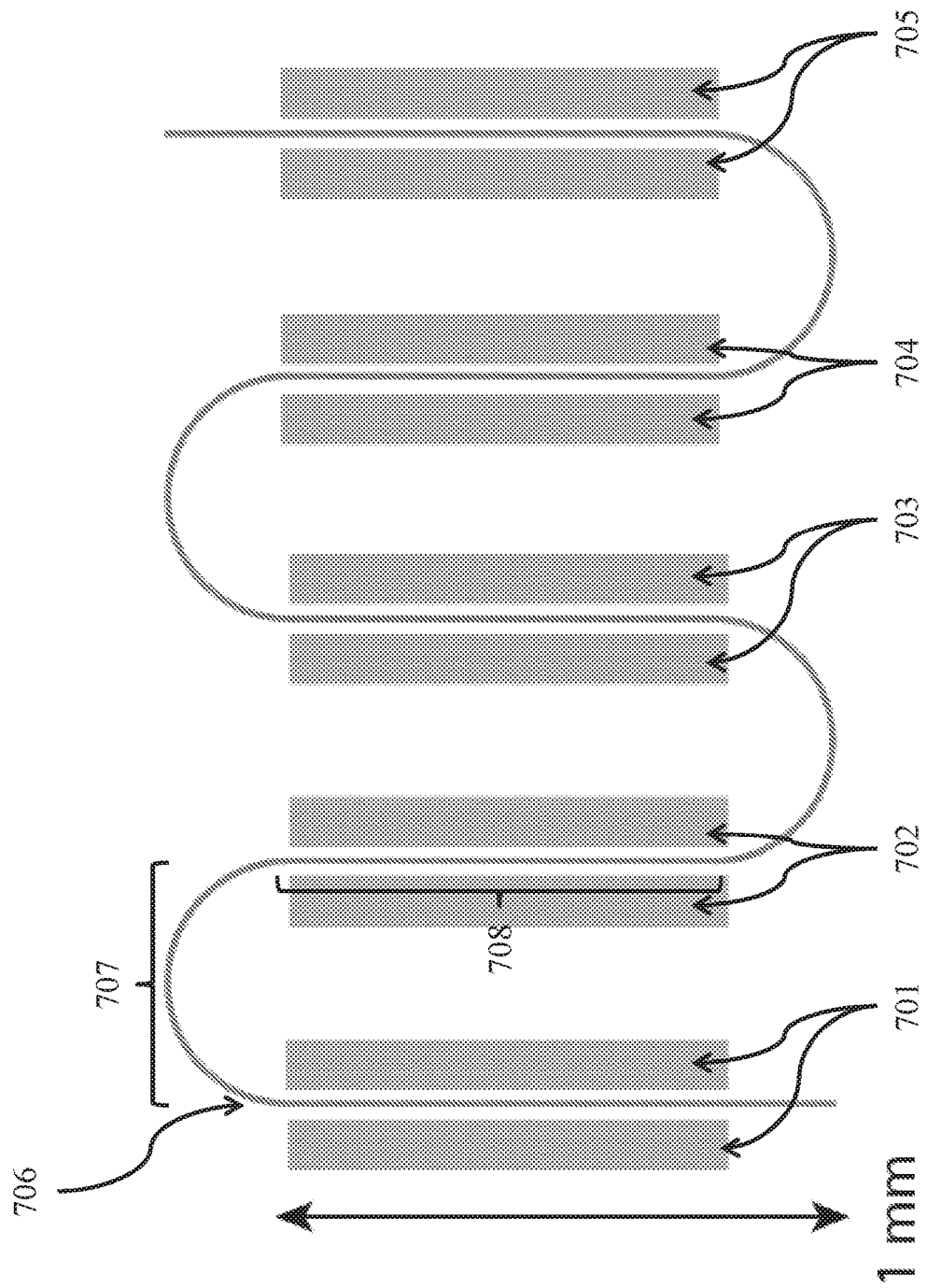
FIG. 7 is a plan view of an exemplary modulator layout according to embodiments of the present disclosure.

Referring to FIG. 7, an exemplary modulator layout according to embodiments of the present disclosure is illustrated. Pairs of electrodes 701 . . . 705 are arranged on either side of waveguide 706. Waveguide 706 is disposed along a serpentine path having a plurality of arcuate segments 707. In some embodiments, the serpentine path comprises a plurality of substantially linear portions 708 connected pairwise by arcuate segments 707. In some embodiments, the arcuate segments are substantially semicircular. In some embodiments, the semicircular bends have a radius of about 5 µm. In other embodiments, the semicircular bends have a radius of about 20 µm. In some embodiments, the waveguide has a width of about 500 nm. In some embodiments, the semicircular bends are separated by less than about 1 mm. In such embodiments, each electrode is less than about 1 mm in length. In general, to facilitate phase matching, each electrodes is less than the wavelength of the RF microwave propagated in the electrical circuit. In some embodiments, each electrode is less than ¼ the wavelength of the RF microwave propagated in the electrical circuit.

Figure 8:
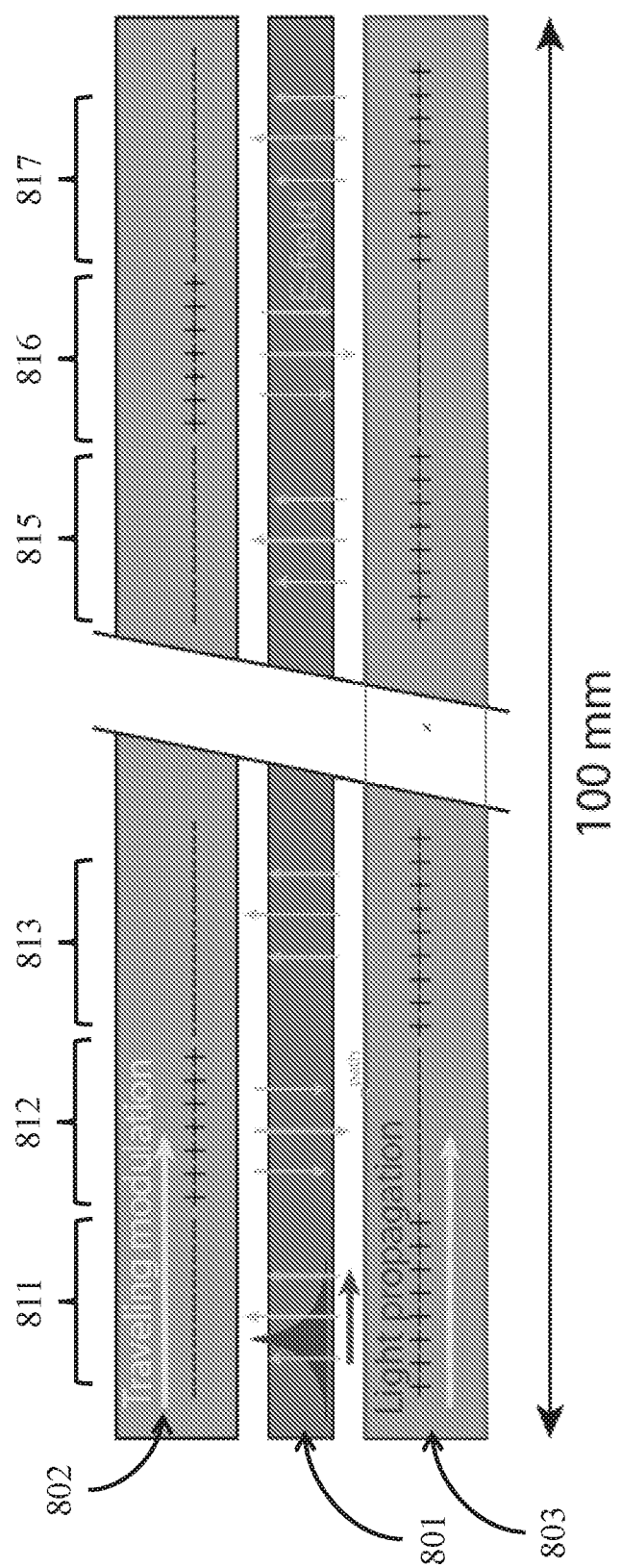
FIG. 8 is a plan view of an exemplary modulator layout illustrating RF phase.
Figure 9:
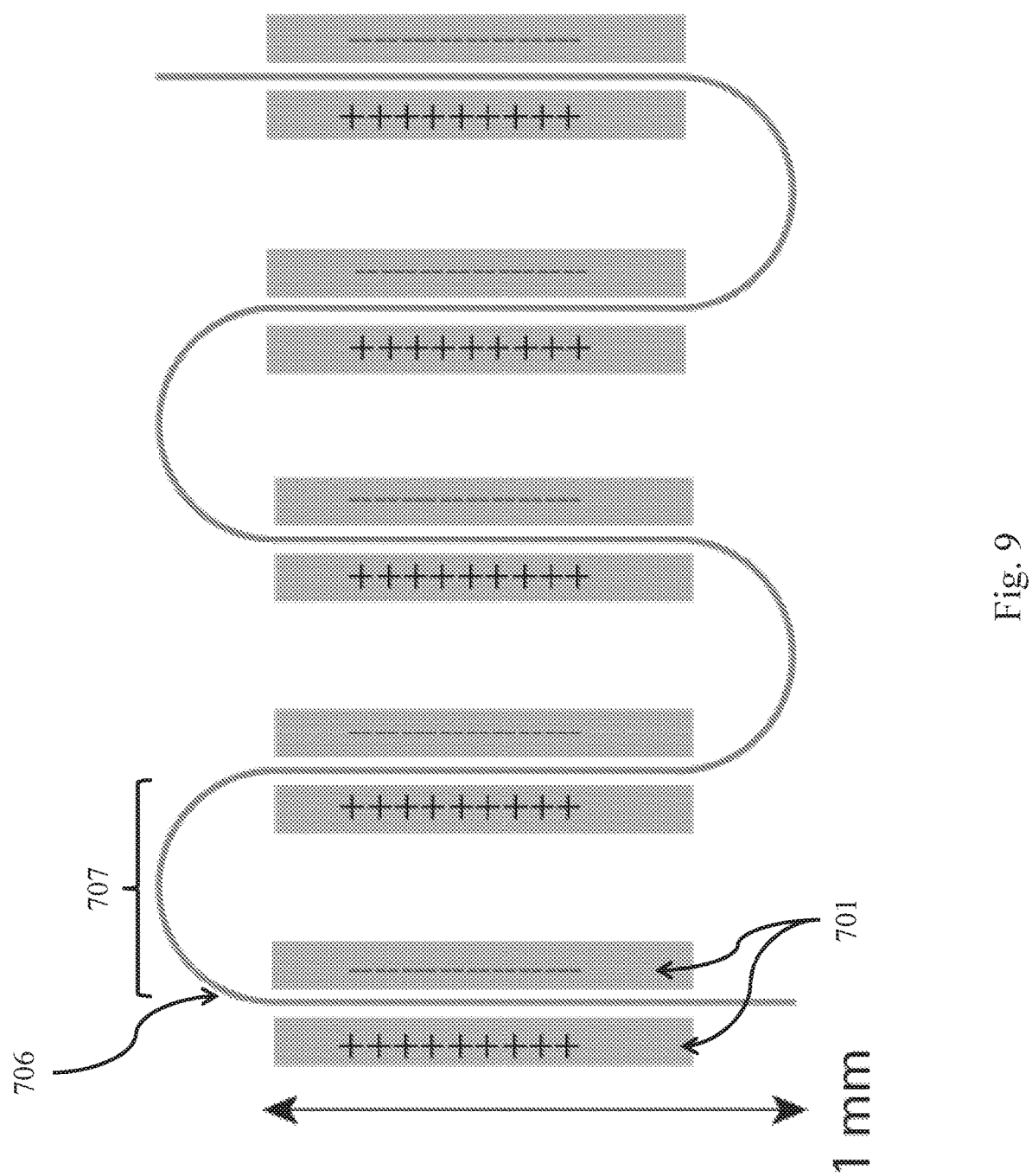
FIG. 9 is a plan view of an exemplary modulator layout according to embodiments of the present disclosure, illustrating RF phase.

Referring to FIGS. 8-9, phase matching according to embodiments of the present disclosure is illustrated. In electro-optic modulators, RF and optical phase matching is a significant consideration when the total electrical wire length is comparable to or longer than the wavelength of the RF microwave. Referring to FIG. 8, an exemplary waveguide 801 is illustrated. Waveguide 801 is flanked by electrodes 802, 803, subjecting it to an electric field. The orientation of the electric field may be reversed at intervals 811 . . . 817. In the example pictured, the electric field experienced by the optical field flips sign every half wavelength when propagating along the electrodes. The orientation of the electrical field may thus cancel the electro-optic shift over some or all of a waveguide.

To address this issue in large straight waveguides, such as the exemplary 10 cm long waveguide pictured, phase matching is required. Modulation is achieved by matching the phase velocities of the electrical and optical waves, so that the optical field experiences the same electrical phase along the entire waveguide. However, this phase matching requires specially designed electrodes and compromises other design goals such as capacitance.

Referring to FIG. 9, waveguide 706 of FIG. 7 is depicted. As discussed further above. waveguide 706 includes bends 707. Because the waveguides include tight bends, even where the total waveguide length remains the same, the RF propagation length along electrodes 701 may be reduced to within ¼ of the RF wavelength. In such embodiments, the optical field experiences an electric field when propagating through the waveguide. It will be appreciated that the polarities indicated are merely exemplary, and a variety of effects may be achieved by manipulation of the electric field according to the present disclosure.

As noted above, alternative LN waveguides are too wide to bend. This results in long straight waveguides that require long electrodes. The length puts major constraints on modulator design. The phase of the optical wave and electrical voltage must be matched. In addition, the electrical propagation loss over long distance at high frequencies must be considered.

The fabrication techniques described herein allow production of very narrow waveguides that enable redesign of device topology. Since waveguides according to the present disclosure may be bent at a tight radius, electrode size may be reduced substantially. This eliminates the aforementioned constraints and enables more efficiency, better performance, higher speed, lower energy consumption, and smaller footprint. In some embodiments, the short electrodes described herein allow modulators to operate at about 40 GHz or higher.

The techniques described herein are applicable to a broad range of integrated electro-optic devices based on thin film LN devices, including Mach-Zehnder interferometer based modulators, switches, and linear modulators. The same fabrication methods are applicable where waveguide-based interferometers are used instead of micro-resonators, so that a much larger optical operation bandwidth can be achieved. The contact electrodes may be placed much closer to each other than alternative bulk LN modulators due to much better light confinement, thus reducing the modulation voltage. Moreover, the small bending radius allows wiring the waveguides and reduces the overall RF propagation length and electronic capacitance, enabling ultra-high speed and low energy consumption modulators. The same device configurations are also applicable to high on/off-ratio, low insertion loss optical switches. Unlike the plasma dispersion effect in silicon and the quantum-confined Stark effect in indium phosphide, the Pockels effect is intrinsically linear. High-speed linear modulators may be built without expensive signal post-processing, which is crucial in analog circuits and communications.

Figure 10:
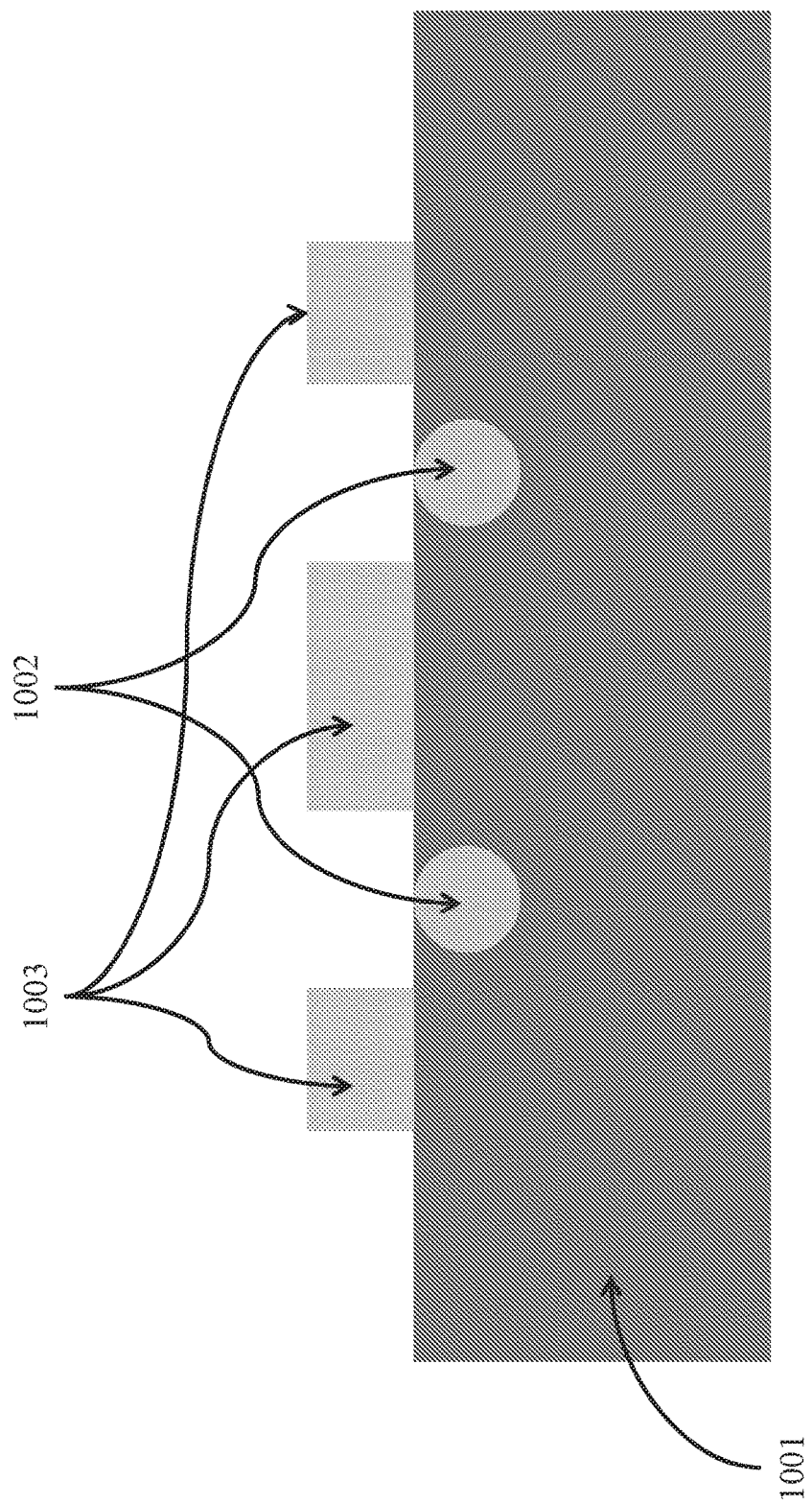
FIG. 10 is a cross-sectional view of an exemplary waveguide according to embodiments of the present disclosure.
Figure 11:
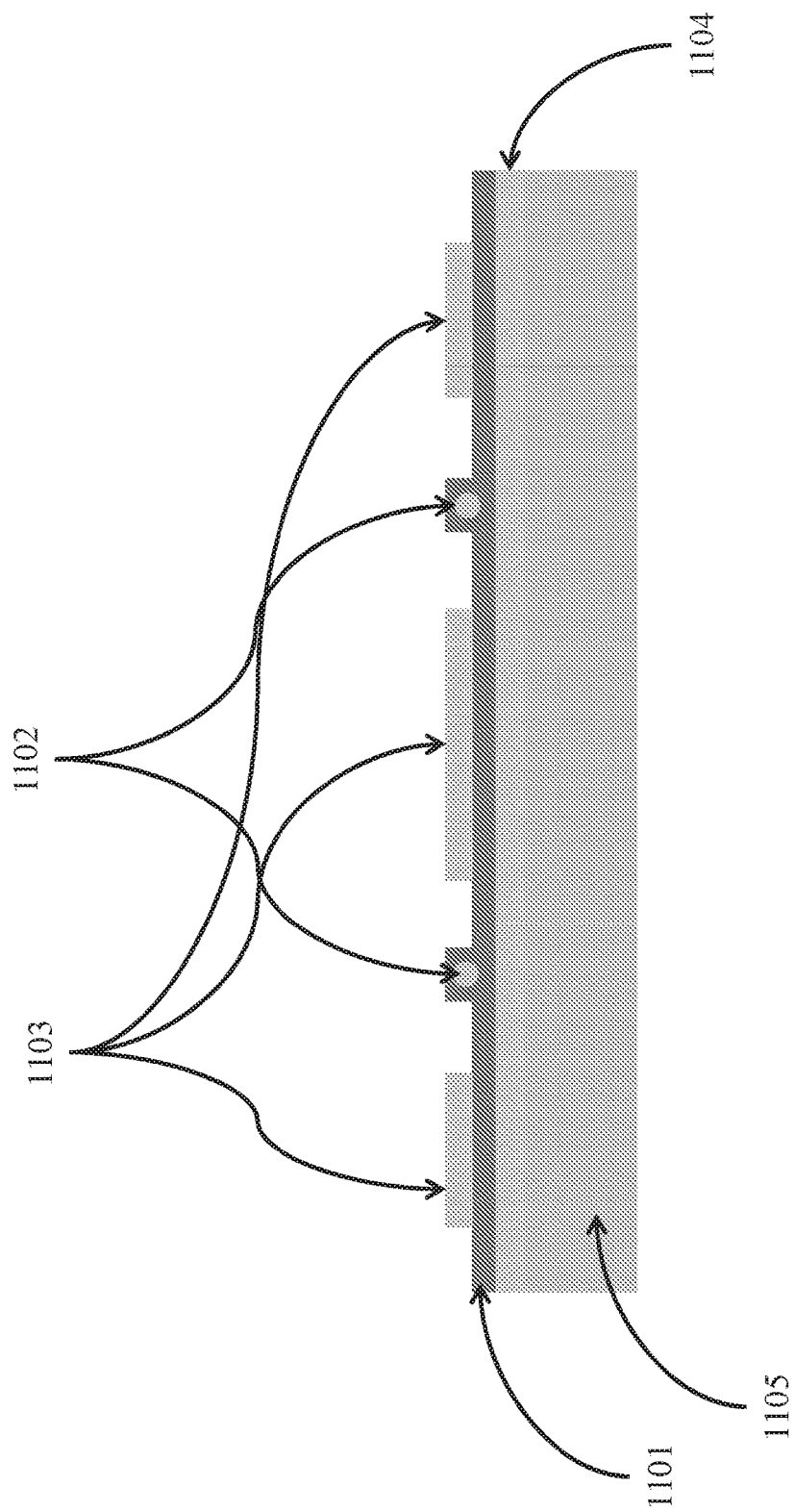
FIG. 11 is a cross-sectional view of an exemplary waveguide according to embodiments of the present disclosure.

Referring now to FIGS. 10-11, microwave transmission line velocity matching is illustrated in cross-sectional views of exemplary waveguides according to the present disclosure. Velocity matching is not supported in alternative LN modulators because the microwave dielectric permittivity of LN is very high (~28). This results in a low microwave group velocity in comparison to light being guided on the LN chip. In alternative modulators, low permittivity $SiO_2$ buffer layers may be used to increase microwave group velocity, which results in reduced modulation efficiency. In thin film designs as set forth herein, because the optical mode is confined in the LN thin film, the substrate is not required to be high permittivity. Thus, the bulk substrate can be a low RF index material such as Si, quartz, silica, sapphire, or a combination thereof, so that the optical and microwave group velocity can be perfect matched.

In FIG. 10, LN waveguide 1001 has high permittivity, resulting in a high index (about 5). The optical index of the optical mode 1002 is about 2.2. As a result, velocity matching is difficult. As described above, in various exemplary embodiments, electrodes 1003 may be gold.

In FIG. 11, LN waveguide 1101 is arranged on $SiO_2$ layer 1104, which in turn is arranged on substrate wafer 1105. In various embodiments, the substrate may be silicon, quartz, silica, sapphire, or a combination thereof. The optical index of the optical mode 1102 is about 2.2. $SiO_2$ layer 1104 and substrate 1105 (e.g., silicon) have a low index (3.4 for silicon, 2.0 for quartz and silica, 3.0-3.3 for sapphire) so the optical and microwave velocity can be matched. As described above, in various exemplary embodiments, electrodes 1003 may be gold.

Due to the improved modulation efficiency obtained through shorter electrodes and better velocity matching, higher bandwidth (of about 100 GHz or greater) with a lower drive voltage (about 2V or less) may be obtained as compared to alternative approaches.

As noted above, LN displays a wide bandgap (high transparency) and a large second order ($\chi 2$) electro-optic coefficient (about 30 pm/V). In contrast to silicon and Indium phosphide (InP), the $\chi 2$ process in LN changes its index of refraction linearly with an applied electrical field, at femtosecond timescale. The efficiency of this process is determined by the overlap of the optical and the electrical fields. Alternative ion-diffused LN waveguides suffer from the low refractive index contrast ($\Delta n<0.02$) between core and cladding, resulting in large optical modal volumes and bending radii. As a result, the photonic structures are large and the radio-frequency (RF) electrodes have to be placed far away from the optical mode to prevent detrimental waveguide propagation loss, significantly reducing electro-optic switching efficiency.

Figure 12:
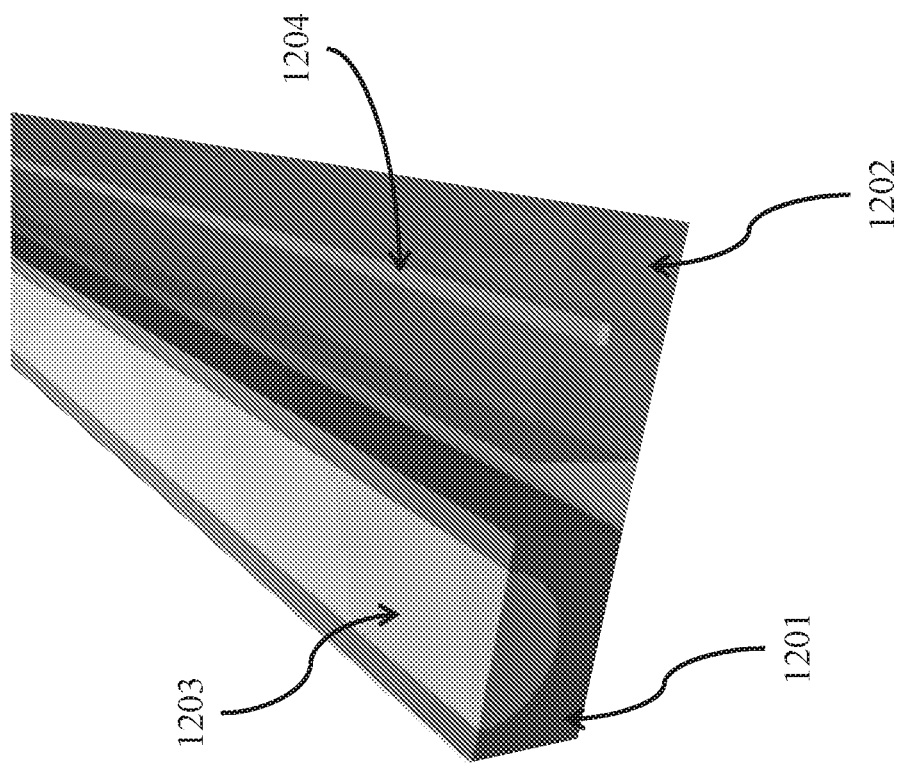
FIG. 12 is a perspective view of an ion-diffused LN waveguide beside an etched LN waveguide according to embodiments of the present disclosure.

Referring to FIG. 12, an ion-diffused LN waveguide 1201 is shown beside an etched LN waveguide embedded in $SiO_2$ 1202, roughly to scale. Regions 1203, 1204 indicate the approximate waveguiding core in each device. The larger index contrast in etched waveguides allows for stronger light confinement.

Figure 13:
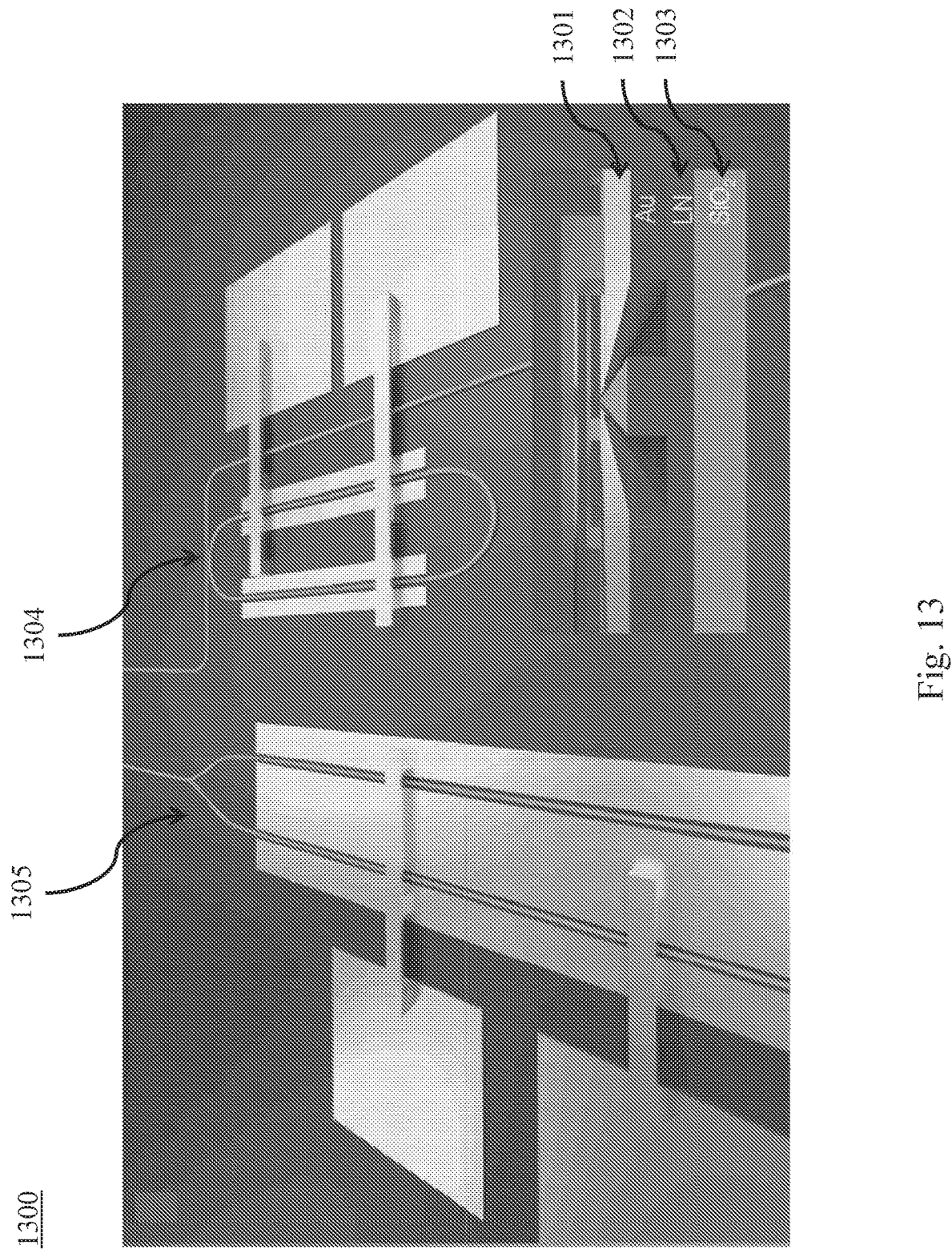
FIG. 13 is a schematic view of an exemplary device layout including thin film LN waveguides and RF electrodes according to embodiments of the present disclosure.

Referring to FIG. 13, an exemplary device layout including thin film LN waveguides and RF electrodes is provides according to embodiments of the present disclosure. Metal vias and bridges are fabricated to achieve modulation on both sides of the devices. The inset shows an exemplary device cross-section illustrating gold electrode layer 1301, LN layer 1302, and $SiO_2$ Layer 1303. Exemplary device 1300 includes racetrack resonator 1304 and Mach-Zehnder interferometer 1305 (depicted partially).

As described herein, exemplary devices such as device 1300 demonstrate single-crystalline LN photonic structures with submicron optical confinement, small bending radii (<20 µm) and low propagation loss. In various embodiments, single-crystalline LN is directly shaped into the nanoscale waveguides. The waveguides are defined on thin-film LN-on-insulator substrates using electron beam lithography and subsequently dry etched in Ar+ plasma using a deposited Si hard mask as described further above. The index contrast between the LN core and the silicon dioxide ($SiO_2$) cladding is Δn=0.67, which is over an order of magnitude higher than alternative ion-diffused LN waveguides.

Figure 14:
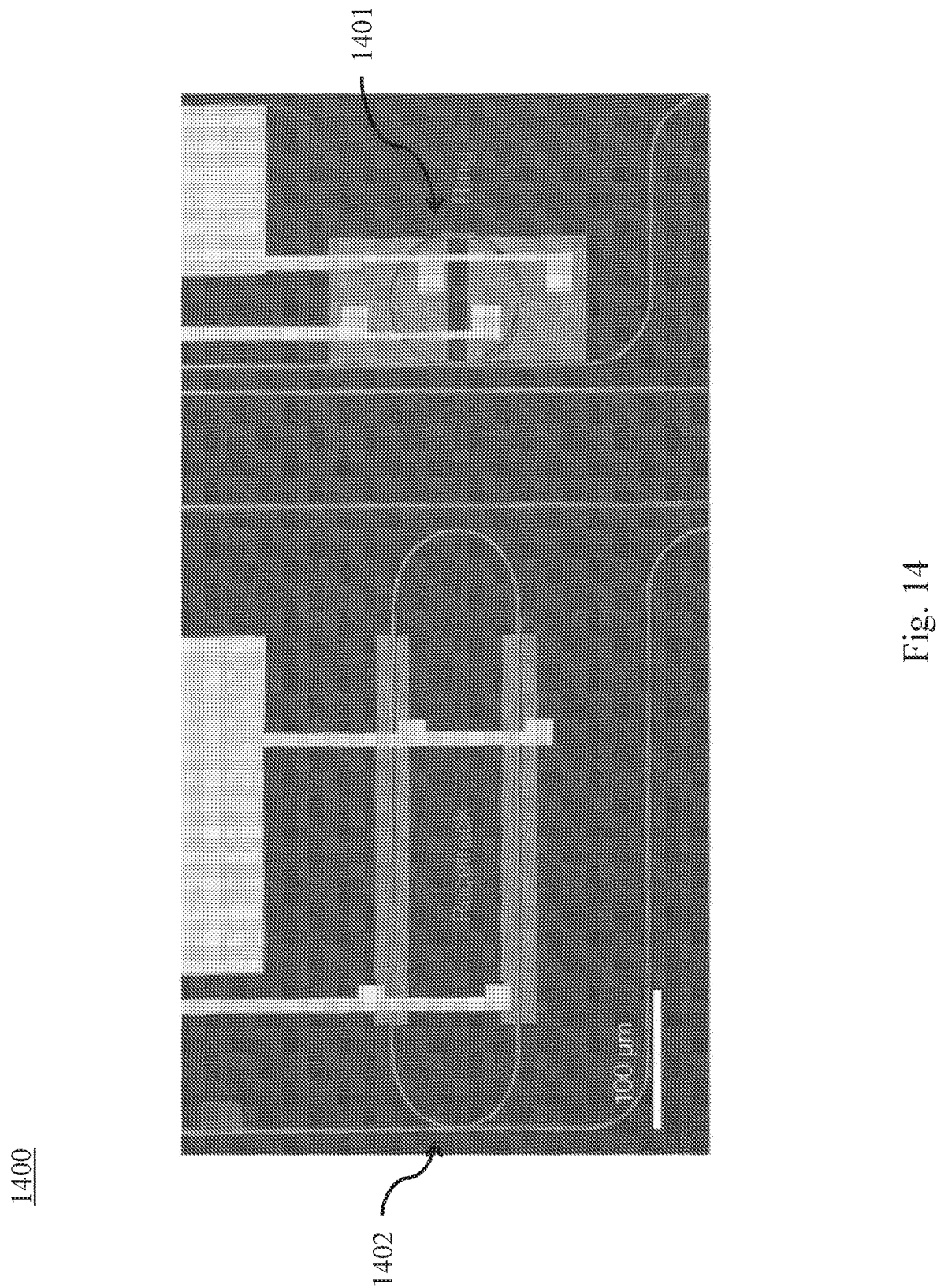
FIG. 14 is a false-color scanning electron microscope (SEM) image of a racetrack and ring resonator based modulator according to embodiments of the present disclosure.

Referring now to FIG. 14, a racetrack and ring resonator based modulator according to embodiments of the present disclosure is shown. Ring resonator 1401 and racetrack resonator 1402 comprise thin-film LN waveguides fabricated as described further above.

Figure 15:
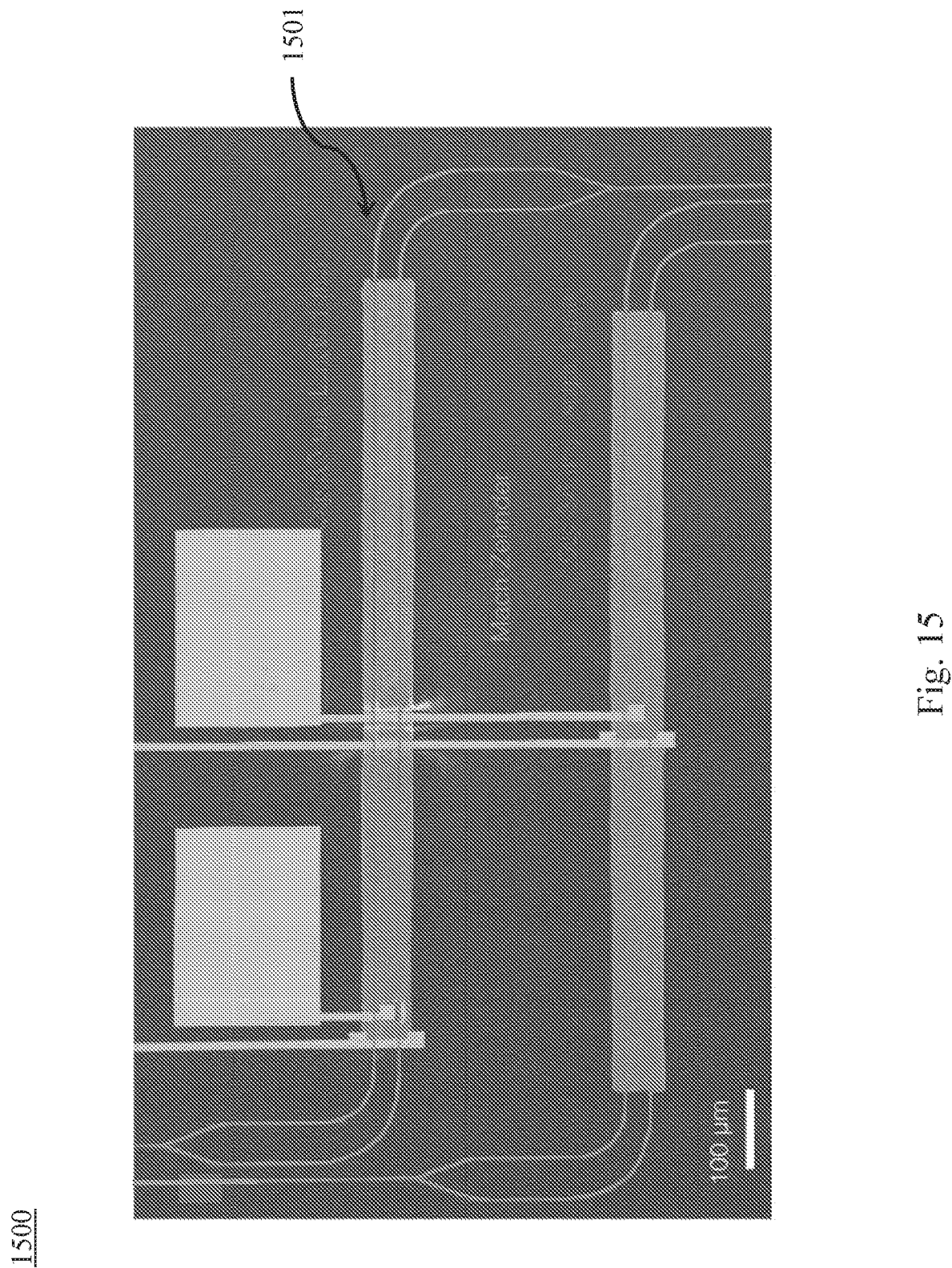
FIG. 15 is a false-color scanning electron microscope (SEM) image of a Mach-Zehnder interferometer based modulator according to embodiments of the present disclosure.

Referring now to FIG. 15, a Mach-Zehnder interferometer based modulator according to embodiments of the present disclosure is shown. Interferometer 1501 comprises thin-film LN waveguides fabricated as described further above.

Figure 16:
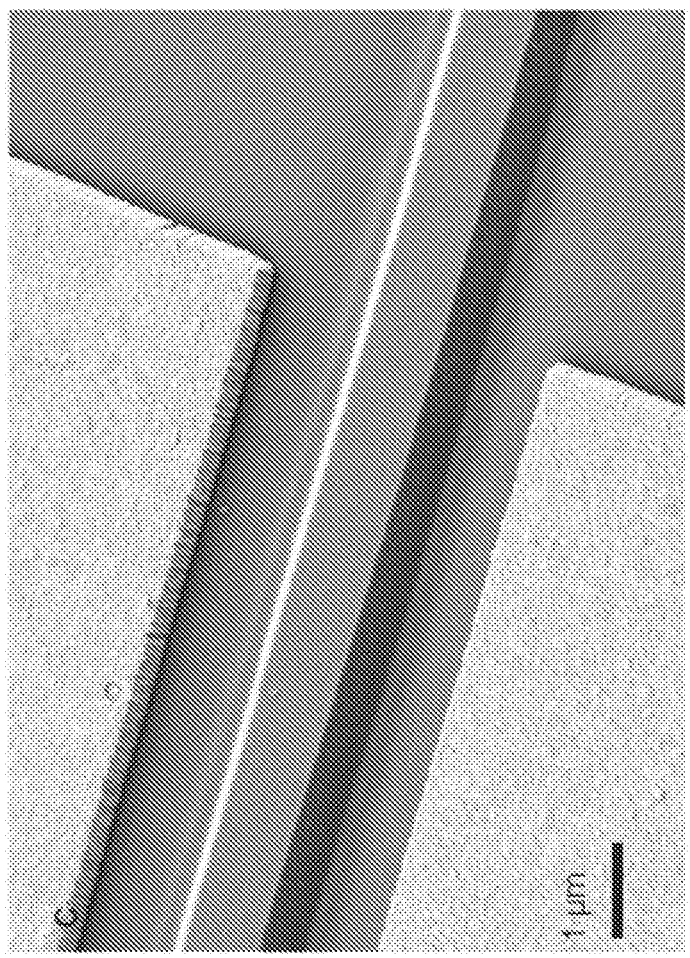
FIG. 16 is a close-up SEM image of exemplary metal electrodes and an associated optical waveguide according to embodiments of the present disclosure.

Referring to FIG. 16, a close-up SEM image of exemplary metal electrodes and an associated optical waveguide is provided.

Figure 17:
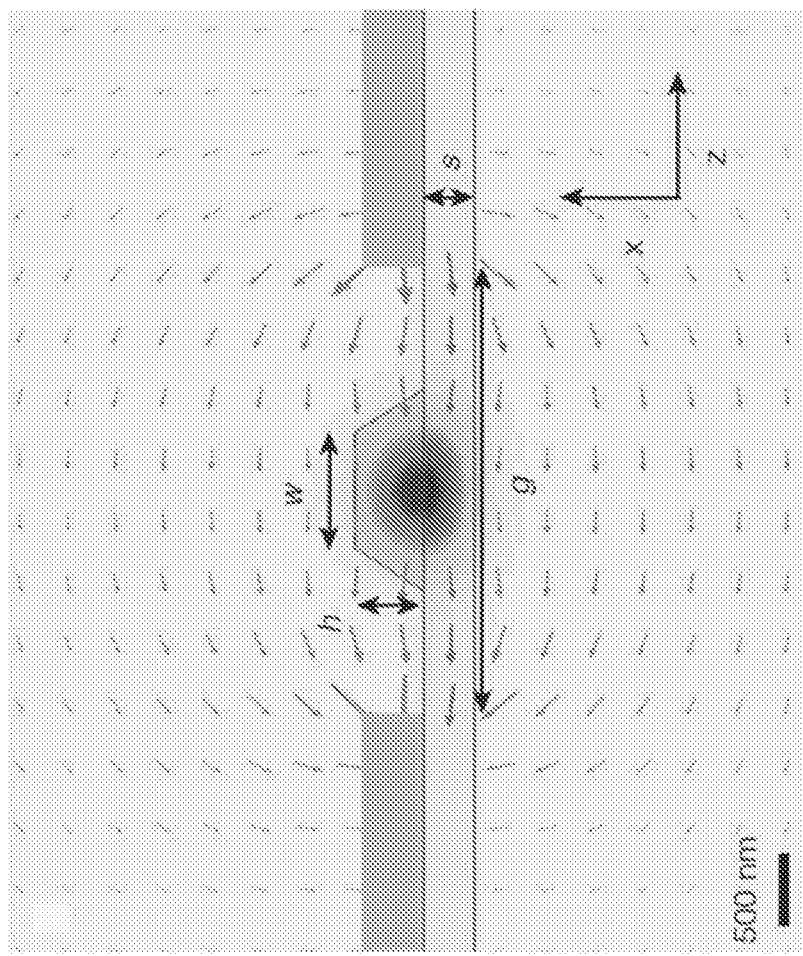
FIG. 17 is a cross-sectional view of a simulated optical transverse electric (TE) mode profile and RF electrical field of waveguides according to embodiments of the present disclosure.

Referring to FIG. 17, a cross-sectional view of a simulated optical transverse electric (TE) mode profile ($E_z$ component) and RF electrical field (shown by arrows) is provided for an exemplary waveguide according to the present disclosure. In this exemplary embodiment, the x-cut LN is most sensitive to the horizontal component of the electric field ($E_z$). In the figure, h corresponds to the LN waveguide height; w corresponds to the waveguide width; s corresponds to the LN slab thickness; and g corresponds to the metal electrode gap.

In the numerically simulated overlap between the corresponding optical and electric fields, the optical waveguides have a top width w=900 nm, rib height h=400 nm, and a slab thickness s=300 nm. To maximize the in-plane electric field ($E_z$), the optical waveguide is sandwiched between the signal and ground electrodes with a gap of g=3.5 µm. A $SiO_2$ cladding layer is used to further enhance this overlap by increasing the dielectric constant of the surrounding media to match the high dielectric constant of LN (of about 28).

The present examples include a range of fabricated nanophotonic LN devices including nano-waveguides, ring resonators, racetrack resonators and Mach-Zehnder interferometers (MZIs). The propagation loss of various exemplary structures is about 3 dB/cm or less. The propagation loss is limited by etching roughness, and in some exemplary structures is about 2 dB/cm or less. Exemplary MZI and racetrack structures described herein have low on-chip insertion loss of about 2 dB or less and about 1 dB or less, respectively. Some exemplary structures display coupling loss of an additional about 5 dB/facet or less.

The highly confined optical mode allows electro-optic modulation efficiency to be maximized by placing gold micro-RF electrodes close to the LN waveguide. As discussed further above, these exemplary devices make use of an x-cut LN configuration, where transverse-electric (TE) optical modes and in-plane electric fields (Ez) interact through the highest electro-optic tensor component ($r_{33}$) of LN. The waveguide geometry and the micro-RF electrode positions facilitate optimal overlap between the optical and electric fields, while minimizing the bending loss and the metal-induced absorption loss.

Figure 18:
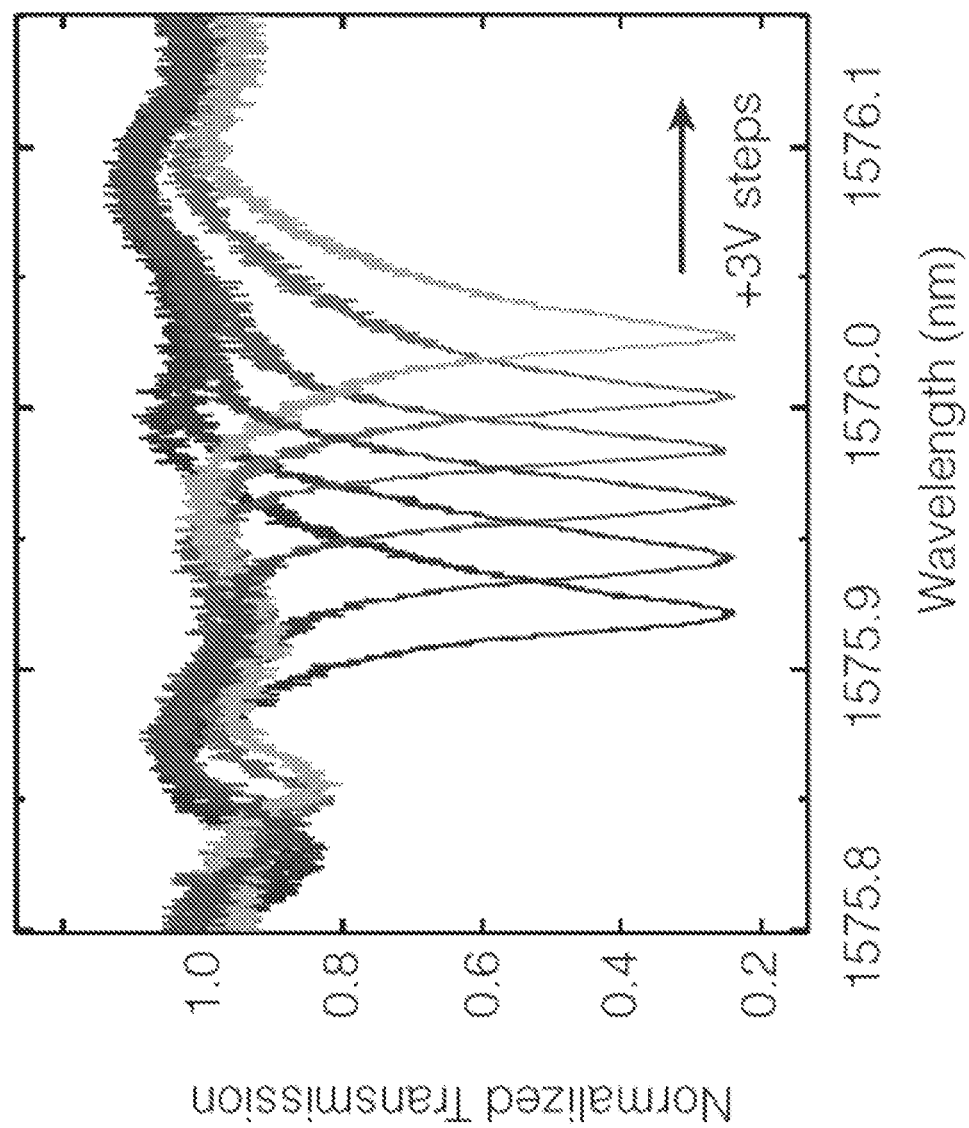
FIG. 18 is a plot of wavelength against normalized transmission in a racetrack resonator according to embodiments of the present disclosure.

Referring now to FIG. 18, the measured transmission spectra of an exemplary high Q (~50,000) racetrack resonator is shown in a plot of wavelength against normalized transmission. Large frequency shifts are shown with applied DC voltages.

Figure 19:
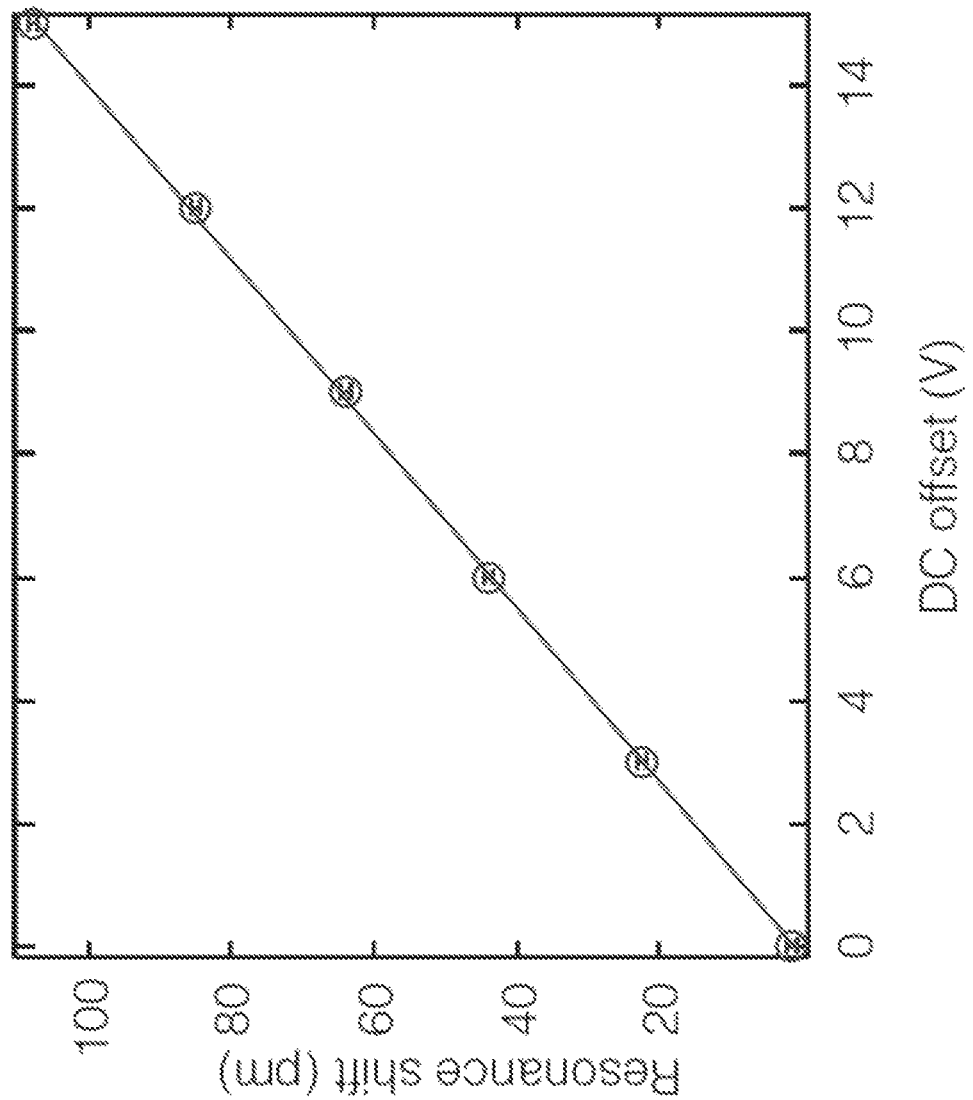
FIG. 19 is a plot of DC offset against resonance shift in a racetrack resonator according to embodiments of the present disclosure.

Referring now to FIG. 19, the linear resonant wavelength shift of an exemplary racetrack resonator is shown as a function of DC voltage with error bars. The measured tuning efficiency is 7.0 pm/V.

Figure 20:
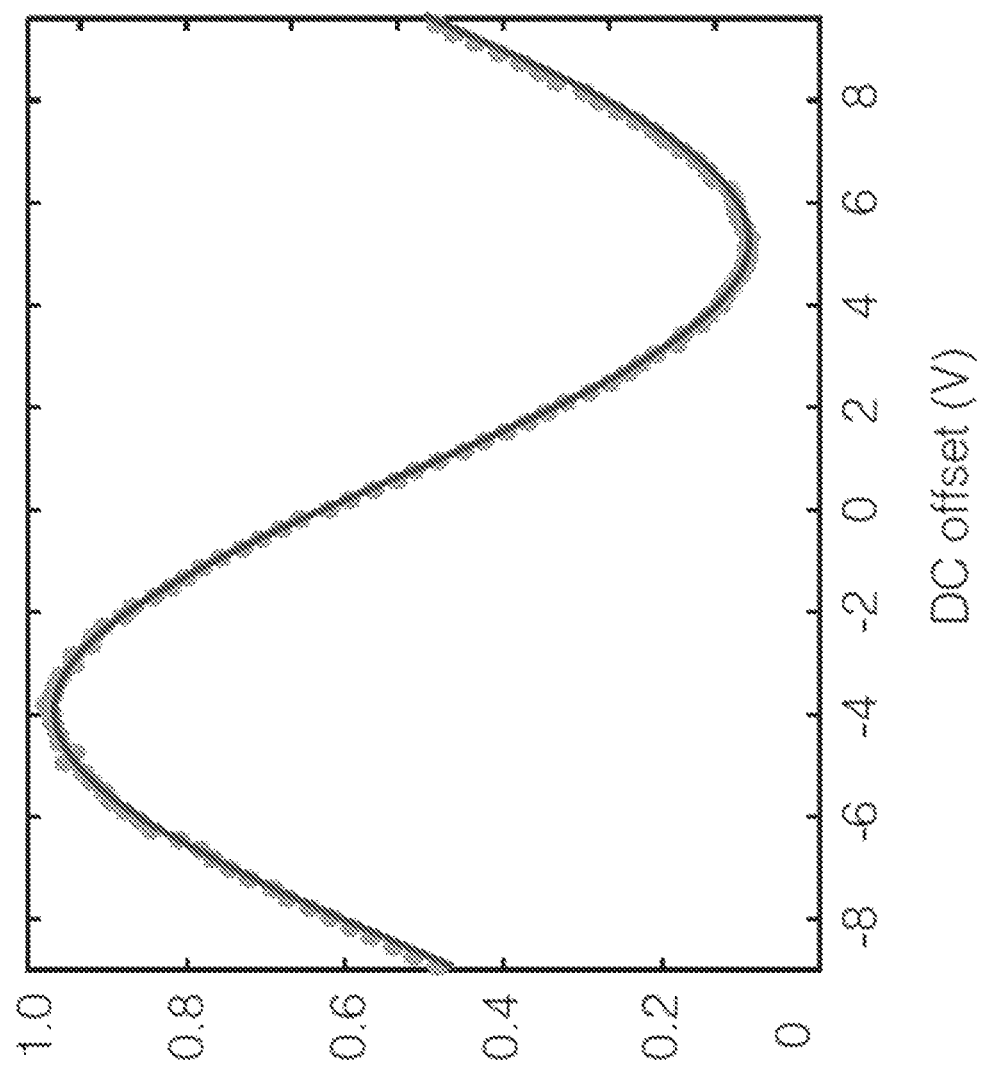
FIG. 20 is a plot of optical transmission against DC offset in a Mach-Zehnder interferometer according to embodiments of the present disclosure.

Referring now to FIG. 20, the optical transmission of an exemplary 2 mm long MZI modulator is plotted against the DC voltage applied. A half-wave voltage ($V_\pi$) of 9 V and a voltage-length product of 1.8 V-cm are indicated.

As shown, efficient and linear electro-optic tuning is provided in a racetrack modulator and a micro-MZI modulator. FIG. 18 shows a transmission spectrum of a racetrack resonator with a loaded quality (Q) factor ~50,000. When a voltage is applied, the change of refractive index modifies the effective optical path length of the resonator, resulting in a resonance frequency shift. The electrical fields on the two racetrack arms are aligned to the same direction so that the modulation on the two arms adds up. The measured electro-optic efficiency is 7.0 pm/V with good linearity and no observable changes in resonance extinction ratio and linewidth. The MZI modulator is a balanced interferometer with two 50:50 Y-splitters and two optical paths. The applied voltage induces a phase delay on one arm and a phase advance on the other, which in turn change the output intensity at the Y-combiner by interference. The minimum voltage that is needed to completely switch the output between on and off is defined as the half-wave voltage ($V_\pi$). A $V_\pi$ of 9 V is measured from a 2 mm long MZI modulator, with 10 dB extinction ratio. This translates to a voltage-length product of 1.8 V-cm, an order of magnitude better than alternative bulk LN devices.

Figure 21:
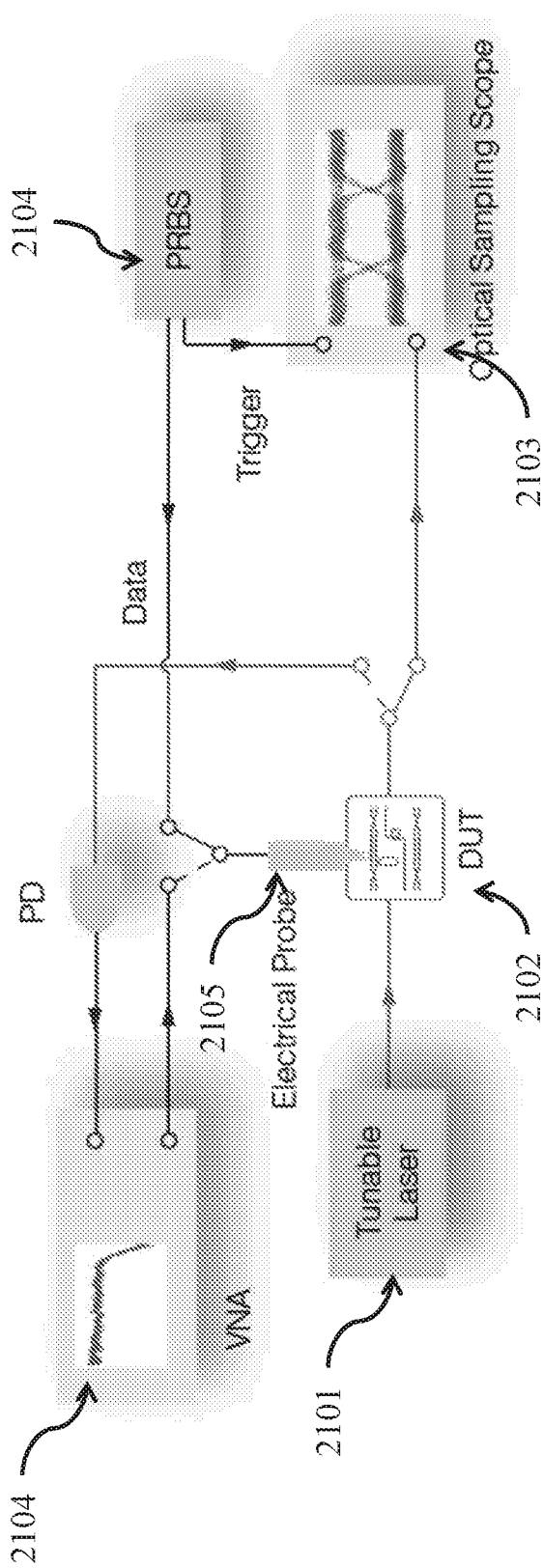
FIG. 21 is a schematic diagram for an apparatus for testing eye diagrams of devices according to the present disclosure.

Referring to FIG. 21, an exemplary setup for testing eye diagrams is depicted. Dashed lines indicate the signal path for electro-optic bandwidth measurement. Tunable laser 2101 probes device under test 2102. Device under test (DUT) 2102 is observed by scope 2103 using pseudo-random binary sequence (PRBS) 2103. Vector network analyzer (VNA) 2104 is in turn coupled to electrical probe 2105.

Figure 22:
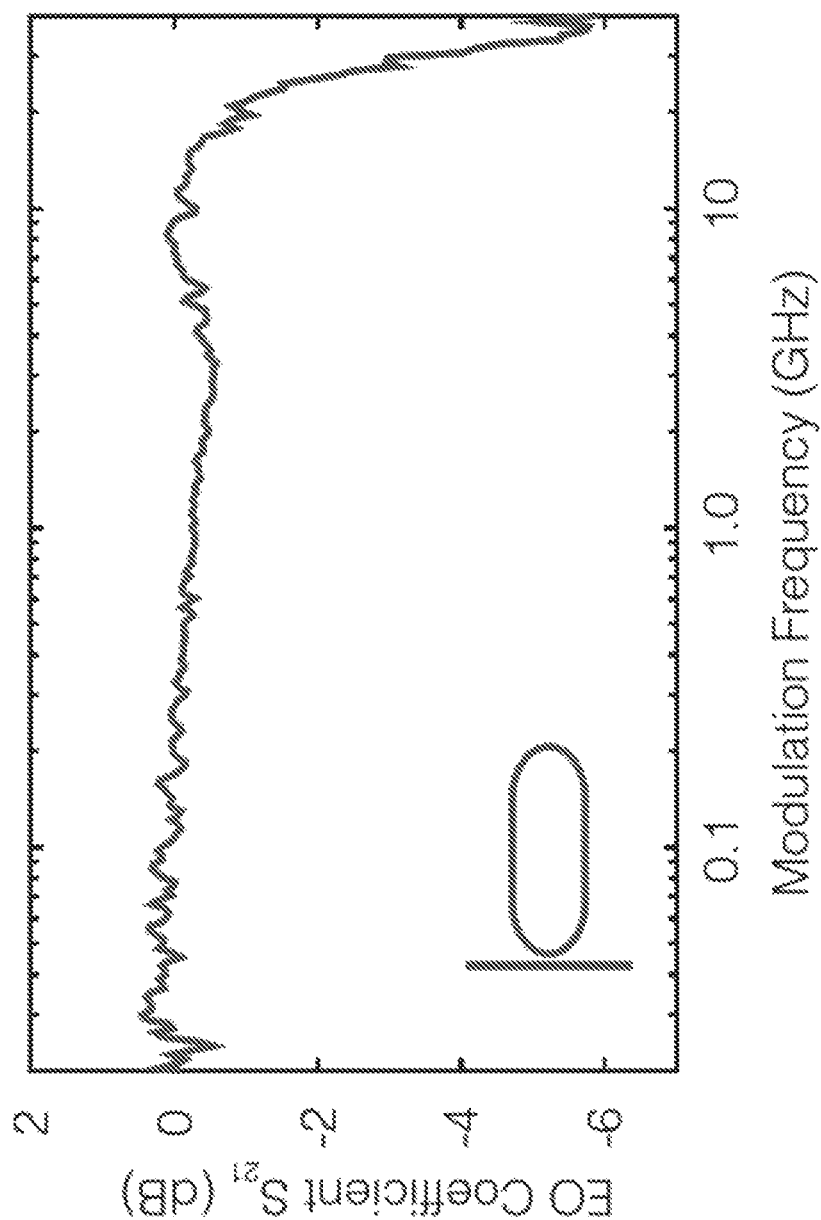
FIG. 22 is a plot of modulation frequency against electro-optic coefficient $S_{21}$ of a racetrack resonator according to embodiments of the present disclosure.

Referring to FIG. 22, the electro-optic bandwidths ($S_{21}$ parameter) of an exemplary racetrack resonator with Q ~8,000 is illustrated. The corresponding 3 dB bandwidth is 30 GHz.

Figure 23:
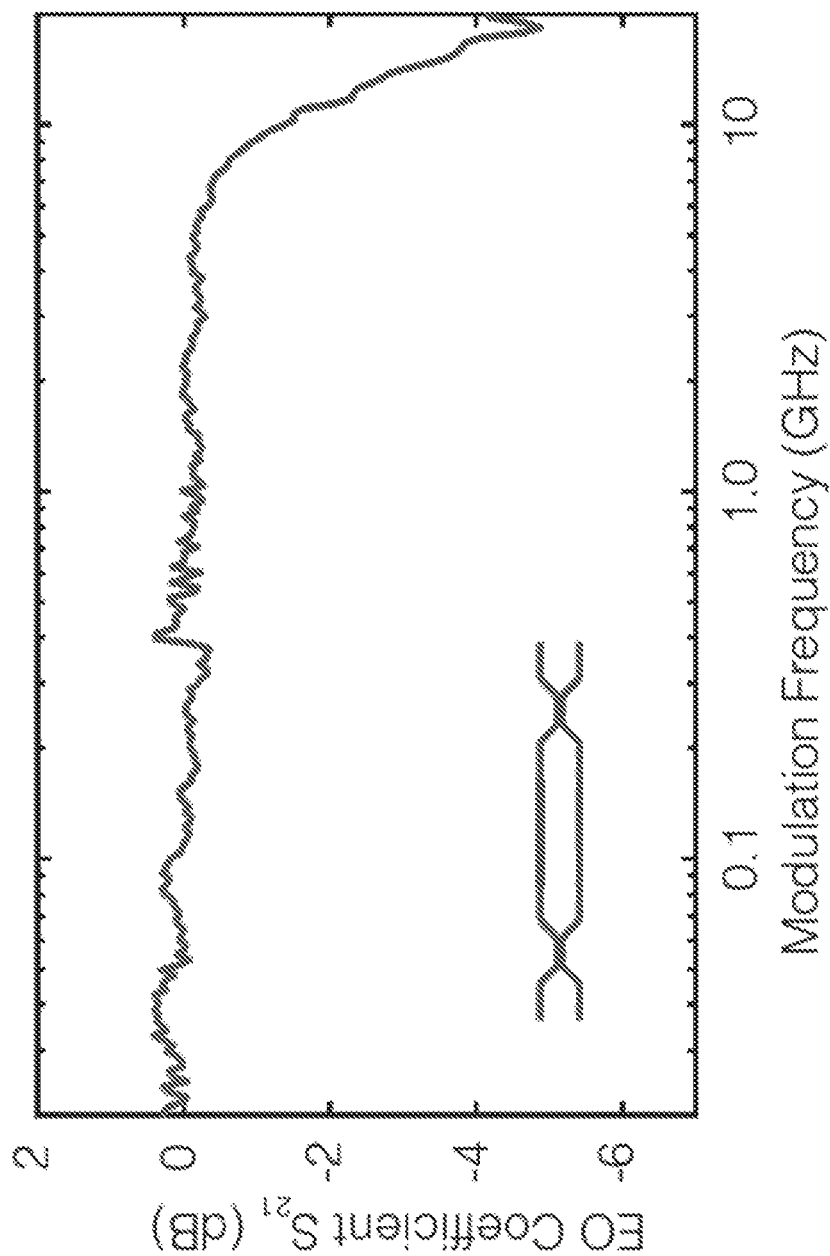
FIG. 23 is a plot of modulation frequency against electro-optic coefficient $S_{21}$ of a Mach-Zehnder interferometer according to embodiments of the present disclosure.
Figure 24A:
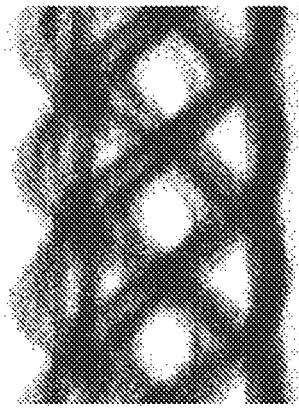
FIGS. 24A-F are eye diagrams of a racetrack resonator and a Mach-Zehnder interferometer according to embodiments of the present disclosure.
Figure 24B:
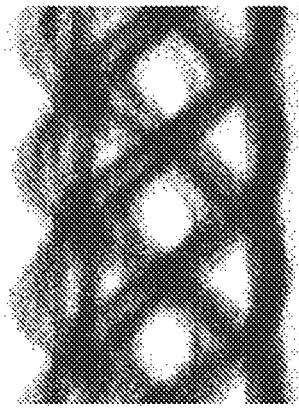
Figure 24C:
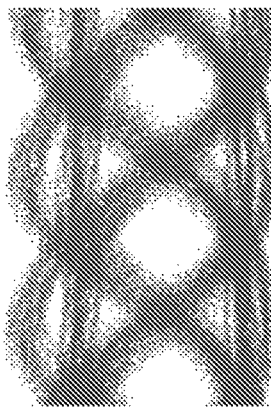
Figure 24D:
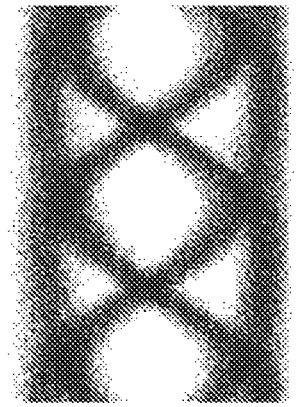
Figure 24E:
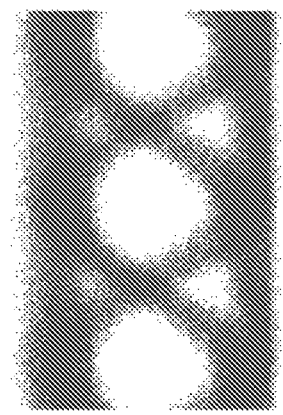
Figure 24F:
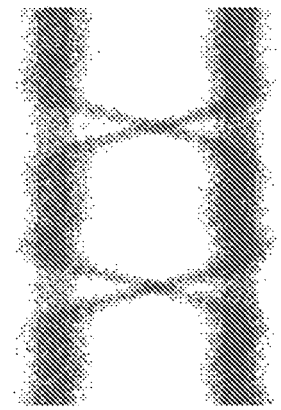

Referring to FIG. 23, the electro-optic bandwidths ($S_{21}$ parameter) of an exemplary 2 mm long MZI is illustrated. The corresponding 3 dB bandwidth is 15 GHz.

Referring to FIG. 24, eye diagrams of the racetrack (FIGS. 24A-C) and MZI (FIGS. 24D-F) modulator with data rates up to 40 Gbps and 22 Gbps are provided. All eye diagrams are measured with $2^7$-1 PRBS in a non-return-tozero scheme with a 5.66 $V_{pp}$ electrical drive. The extinction ratios are 3 dB and 8 dB for racetrack resonator and MZI respectively.

Referring to FIG. 25, eye diagrams of the MZI modulator at 12.5 Gbps (FIG. 25A) and 22 Gbps (FIG. 22B) are provided with the device heated up by 20° C. The extinction ratio is 8 dB.

As shown, LN devices according to the present disclosure exhibit high electro-optic bandwidths ($S_{21}$ parameter), which is characterized using a network analyzer and a high-speed photodiode (as shown in FIG. 21). For a racetrack resonator modulator featuring a Q factor of 8,000, a 3 dB electro-optic bandwidth of 30 GHz is measured (as shown in FIG. 22). This value is limited by the cavity-photon lifetime of the resonator (about 6 ps). The lifetime limited bandwidth is confirmed by testing additional resonators with Qs of 5,700 and 18,000.

The resulting 3 dB bandwidths are 40 GHz and 11 GHz respectively. The Q factors are engineered from the intrinsic value by controlling the distance between the RF electrodes and the optical waveguide. The intrinsic RC bandwidth limit of the racetrack modulator is estimated to be over 100 GHz.

For the exemplary 2 mm long MZI device with direct capacitive modulation, the measured electro-optic 3 dB bandwidth is about 15 GHz (as shown in FIG. 23). This is limited by the RC constant due to a larger capacitance (about 0.2 pF) induced by the longer RF electrode used. The measured bandwidth is limited by the 50Ω impedance of the network analyzer drive in this example, as the on-chip electrical resistance is small (<10Ω).

This platform supports data transmission rates as high as 40 Gbps. FIG. 24 displays non-return-to-zero (NRZ) open eye diagrams for both racetrack and MZI modulators at various data rates, obtained with $2^7$-1 (pseudo-) random binary sequence at 5.66 $V_{pp}$. Because of the high signal quality, these devices can operate at data rates 1.5 times their 3 dB bandwidth, which translates to 40 Gbps and 22 Gbps for the racetrack and MZI devices respectively. The measured extinction ratios of these modulators are 3 dB and 8 dB with power consumptions ($CV^2/4$) of 240 fJ/bit and 1.6 pJ/bit respectively.

The MZI modulators maintain the stable thermal properties of their bulk counterparts, due to the low thermo-optic coefficient of LN ($3.9\times10^{-5}K^{-1}$). FIG. 25 illustrates the eye diagrams across a ΔT=20° C. range. The MZI modulator is able to maintain an open eye diagram at the maximum data rate of 22 Gbps without any feedback to compensate for temperature drifts (open loop configuration).

Micrometer scale LN modulators as described herein feature high-bandwidth, excellent linearity, low voltage and good temperature stability. The high dielectric constant of LN ($E_{RF}$ 28) dictates that RF fields in LN propagate much slower than optical fields ($\varepsilon_{opt}$~4) resulting in performance trade-off between bandwidth and driving voltage. In the thin-film monolithic LN approach described herein, phase matching can be achieved since the electrical field primarily resides in the low dielectric $SiO_2$ ($\varepsilon_{opt}$~4) and readily propagates at nearly the same group velocity as light. The thin-film micro-MZI modulators, with a phase-matched RF transmission line architecture, can simultaneously achieve ultra-high bandwidth (>60 GHz) and low modulation voltage (~1 V), and therefore are directly drivable with CMOS circuitry.

The active micro-resonators and low loss waveguides enable chip-scale photonic circuits densely integrated with switches, filters, and nonlinear wavelength sources that operate in a wide wavelength range (from visible to mid-IR). Furthermore, the ultra-compact footprint (as small as 30 µm×30 µm) of micro-ring modulators is attractive for data center applications where real estate is at a premium. The high-performance monolithic LN nanophotonic platform described herein provides a practical cost-effective solution to meet the growing demands of next-generation data centers and metro and long-haul optical telecommunications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device comprising:
   a substrate having a first side;
   a lithium niobate optical waveguide disposed on the first side of the substrate, the optical waveguide comprising:
   a central ridge; and
   legs extending outwards from the central ridge along the first side of the substrate,
   wherein the central ridge consists essentially of undoped lithium niobate,
   the device further comprising a pair of electrodes disposed on the first side of the substrate such that each of the legs of the optical waveguide extends from the central ridge to one of the pair of electrodes,
   wherein the optical waveguide comprises a substantially semicircular bend having a radius of about 50 µm or less.

2. The device of claim 1, wherein the central ridge has a width of about 1 µm or less.

3. The device of claim 1, wherein the legs have a height less than a height of the central ridge.

4. The device of claim 3, wherein the height of the legs is less than or equal to half the height of the central ridge.

5. The device of claim 3, wherein the legs have a height of about 300 nm.

6. The device of claim 1, wherein the lithium niobate is crystalline and disposed such that the x-axis of its crystal lattice extends substantially perpendicular to the first side of the substrate.

7. The device of claim 1, wherein the central ridge has a thickness of about 1 µm or less.

8. The device of claim 7, wherein the central ridge has a thickness of about 400 nm or more.

9. The device of claim 1, wherein the substrate is an insulator.

10. The device of claim 9, wherein the insulator has a refractive index less than that of the optical waveguide.

11. The device of claim 9, wherein the insulator comprises silicon dioxide.

12. The device of claim 1, further comprising:
    a carrier, the substrate being disposed on the carrier.

13. The device of claim 12, wherein the carrier comprises lithium niobate, silicon, quartz, silica or sapphire.

14. The device of claim 1, wherein the electrodes comprise metal.

15. The device of claim 14, wherein the electrodes comprise gold.

16. The device of claim 1, wherein the pair of electrodes is adapted to modulate an optical mode of the optical waveguide when a voltage is applied across the pair of electrodes.

17. The device of claim 1, wherein the pair of electrodes each have a length of about 1 mm or less.

18. The device of claim 1, wherein the electrodes of the pair of electrodes are separated by about 3.5 μm.

19. The device of claim 1, wherein the optical waveguide is disposed along a substantially annular path.

20. The device of claim 1, wherein the optical waveguide is disposed on the first side of the substrate to form a ring resonator.

21. The device of claim 1, wherein the optical waveguide is disposed on the first side of the substrate to form a racetrack resonator.

22. The device of claim 1, wherein the optical waveguide is disposed on the first side of the substrate to form a Mach-Zehnder interferometer.

23. The device of claim 1, wherein the device is adapted to shift a resonance wavelength by an applied voltage.

24. The device of claim 1, wherein the device is adapted to provide velocity matching.

25. The device of claim 1, wherein the device is adapted to provide electro-optic modulation.

26. The device of claim 1, wherein at least a portion of each of the legs is disposed beneath a respective one of the electrodes.

27. A device comprising:
a substrate having a first side;
a lithium niobate optical waveguide disposed on the first side of the substrate, the optical waveguide comprising:
a central ridge, and
legs extending outwards from the central ridge along the first side of the substrate,
wherein the central ridge consists essentially of undoped lithium niobate,
the device further comprising a pair of electrodes disposed on the first side of the substrate such that each of the legs of the optical waveguide extends from the central ridge to one of the pair of electrodes,
wherein the optical waveguide is disposed along a substantially serpentine path defined by a plurality of arcuate segments,
wherein each of the arcuate segments has a radius of less than about 50 μm.

28. The device of claim 27, wherein the arcuate segments are substantially semicircular.

29. The device of claim 27, wherein the arcuate segments are separated from one another by about 1 mm or less.

* * * * *